United States Patent
Bossio et al.

(10) Patent No.: US 11,900,072 B1
(45) Date of Patent: Feb. 13, 2024

(54) QUICK LOOKUP FOR SPEECH TRANSLATION

(71) Applicant: Amazon Technologies, Inc., Seattle, WA (US)

(72) Inventors: Lee Michael Bossio, Watertown, CT (US); Kartik Suchindra Babu, Pittsburgh, PA (US); John Thomas Beck, Bethel Park, PA (US)

(73) Assignee: Amazon Technologies, Inc., Seattle, WA (US)

( * ) Notice: Subject to any disclaimer, the term of this patent is extended or adjusted under 35 U.S.C. 154(b) by 484 days.

(21) Appl. No.: 15/653,000

(22) Filed: Jul. 18, 2017

(51) Int. Cl.
*G06F 40/58* (2020.01)
*G10L 15/30* (2013.01)
*G06F 40/47* (2020.01)
*G06F 3/0482* (2013.01)

(52) U.S. Cl.
CPC .............. *G06F 40/58* (2020.01); *G06F 40/47* (2020.01); *G10L 15/30* (2013.01); *G06F 3/0482* (2013.01)

(58) Field of Classification Search
CPC .... G06F 17/289; G06F 17/2735; G06F 17/28; G06F 9/454; G06F 17/2827
See application file for complete search history.

(56) References Cited

U.S. PATENT DOCUMENTS

| | | | | |
|---|---|---|---|---|
| 6,442,524 B1 * | 8/2002 | Ecker | ................... | G06F 17/2755 704/257 |
| 7,539,619 B1 * | 5/2009 | Seligman | ............ | G06F 17/2755 704/2 |
| 2007/0203688 A1 * | 8/2007 | Fuji | .......................... | G06F 40/40 704/2 |
| 2008/0221898 A1 * | 9/2008 | Cerra | ...................... | G10L 15/30 704/270.1 |
| 2009/0234647 A1 * | 9/2009 | Scholz | .................... | G10L 15/30 704/235 |
| 2009/0248392 A1 * | 10/2009 | Talwar | .................. | G06F 17/289 704/3 |
| 2011/0153324 A1 * | 6/2011 | Ballinger | ................ | G10L 15/26 704/235 |

(Continued)

*Primary Examiner* — Mark Villena
(74) *Attorney, Agent, or Firm* — Pierce Atwood LLP

(57) ABSTRACT

Offered is a system that presents on a display screen a translation of a sentence together with an untranslated version of the sentence, and that can cause both of the displayed sentences to break apart into component parts in response to a simple user action, e.g., double-tapping on one of them. When the user selects (e.g., taps on) any portion of either version of the sentence, the system can identify a corresponding portion of the other version (in the other language). In some implementations, a user device can include both a microphone and a display screen, and an automatic speech recognition (ASR) engine can be used to transcribe the user's speech in one language (e.g., English) into text. The system can translate the resulting text into another language (e.g., Spanish) and display the translated text on the display screen along with the untranslated text. When a user selects a portion of a sentence, the system can also present information about the selected portion (e.g., a dictionary definition) and/or enable selection of a modification to the selected portion (e.g., a different one of the N-best results that were generated by a translation service or an automatic speech recognition (ASR) service).

24 Claims, 18 Drawing Sheets

(56) References Cited

U.S. PATENT DOCUMENTS

| | | | | |
|---|---|---|---|---|
| 2012/0123765 A1* | 5/2012 | Estelle | G06F 17/277 | 704/3 |
| 2012/0131520 A1* | 5/2012 | Tang | G06K 9/2081 | 715/863 |
| 2012/0296635 A1* | 11/2012 | Brockett | G06F 40/131 | 704/9 |
| 2013/0130209 A1* | 5/2013 | Fischler | G09B 19/06 | 434/157 |
| 2013/0144592 A1* | 6/2013 | Och | G06F 17/273 | 704/2 |
| 2013/0191108 A1* | 7/2013 | Anisimovich | G06F 40/284 | 704/4 |
| 2013/0268259 A1* | 10/2013 | Kim | G06F 17/289 | 704/7 |
| 2014/0006007 A1* | 1/2014 | Sumita | G06F 17/289 | 704/4 |
| 2014/0180670 A1* | 6/2014 | Osipova | G06F 17/276 | 704/3 |
| 2014/0242955 A1* | 8/2014 | Kang | G06F 17/289 | 455/414.1 |
| 2015/0019240 A1* | 1/2015 | Yin | G06F 40/58 | 705/2 |
| 2015/0347389 A1* | 12/2015 | Lee | G06F 17/2735 | 704/2 |
| 2016/0267074 A1* | 9/2016 | Nozue | G06F 17/2205 | |
| 2016/0350290 A1* | 12/2016 | Fujiwara | G06F 17/2854 | |
| 2017/0031901 A1* | 2/2017 | Song | G06F 40/58 | |
| 2017/0148436 A1* | 5/2017 | Sugiura | G10L 15/14 | |
| 2017/0364512 A1* | 12/2017 | Han | G06F 40/53 | |
| 2018/0336891 A1* | 11/2018 | Sun | B25J 9/1694 | |
| 2019/0034080 A1* | 1/2019 | Nagel | G06F 40/58 | |

\* cited by examiner

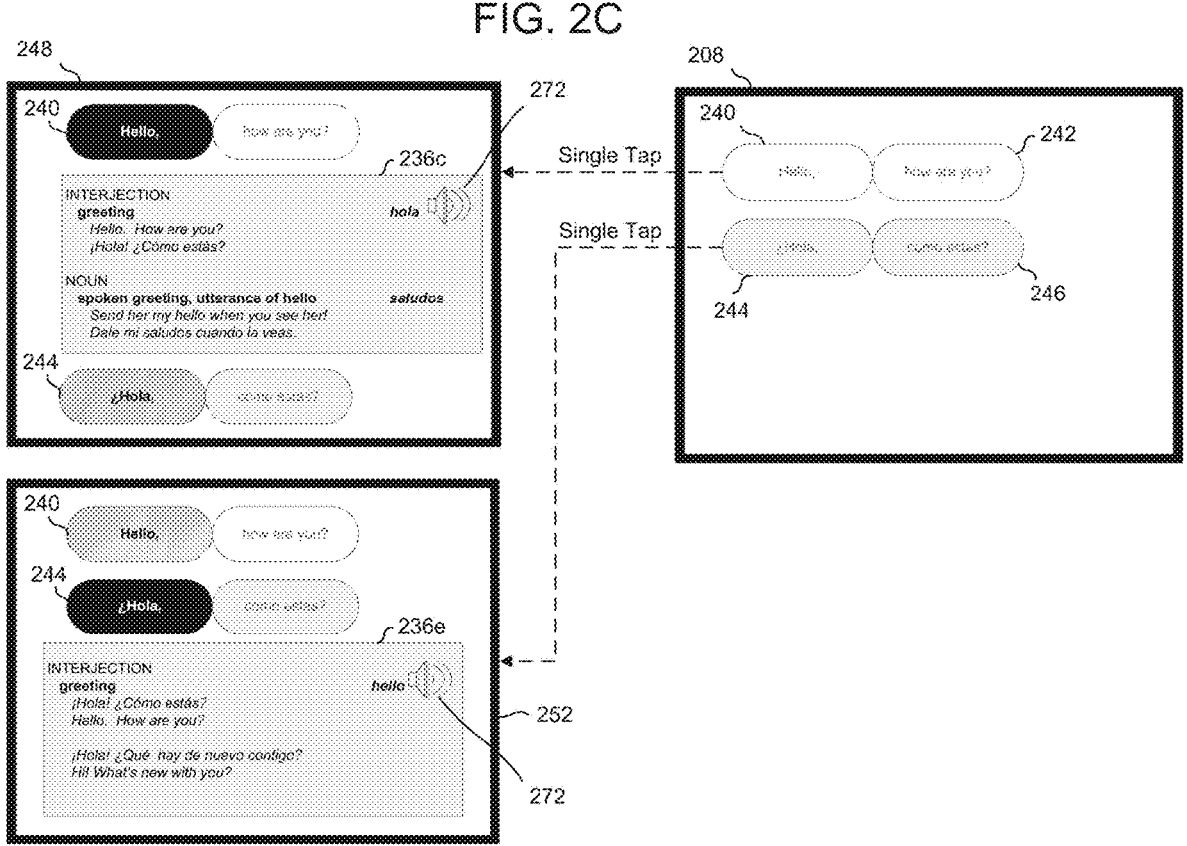

US 11,900,072 B1

QUICK LOOKUP FOR SPEECH TRANSLATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

Statistical machine translation systems generate translations on the basis of statistical models derived from an analysis of bilingual text. In particular, text segments can be translated based upon a probability distribution that a segment in a target language (e.g. Spanish) is a translation of a segment in a source language (e.g. English).

BRIEF DESCRIPTION OF DRAWINGS

For a more complete understanding of the present disclosure, reference is now made to the following description taken in conjunction with the accompanying drawings.

FIGS. 2A-2D illustrate examples of screens that may appear on a user device in connection with some embodiments of the present disclosure;

DETAILED DESCRIPTION

Offered is a system that can improve machine translation and correction by providing a user with the ability to manipulate and correct segments of a translated sentence through a graphical user interface (GUI). In particular, the system can display a machine translation of a sentence together with an untranslated version of the sentence, and can cause both of the displayed sentences to break apart into component parts in response to receiving a command to do so, for example by detecting a user double-tapping on one of them. In response to selection (e.g., tap) corresponding to any portion of either version of the sentence, the system can identify a corresponding portion of the other version (in the other language), as well as reveal information about the selected portion (e.g., a dictionary definition) and/or enable selection of a modification to the selected portion (e.g., a different one of the N-best results that were generated by a translation service). In some implementations, the sentences can first be broken down into phrases (noun phrases, verb phrases, gerund phrases, infinitive phrases, appositive phrases, adverbial phrases, adjectival phrases, participial phrases, prepositional phrases, absolute phrases, etc.), and the resulting phrases can further be broken down (e.g., by double tapping on them), and so on, until one or both of the sentences have been fully broken down into discrete words.

In some embodiments, the system can generate the original and translated versions of the sentence in response to a user spoken command. For instance, in some implementations a user device can include both a microphone and a display screen, and an automatic speech recognition (ASR) engine can be used to transcribe the user's speech in one language (e.g., English) into text. The resulting text can then be translated into another language (e.g., Spanish) by a translation service and displayed on the display screen along with the untranslated text, as noted above.

In some embodiments, a user device can begin transmitting audio data to an ASR engine upon detection of an uttered wakeword, e.g., "Alexa." Additionally or alternatively, in some embodiments, translation of an uttered phrase can be performed in response to the recognition of a user's verbal request for that service. For example, after uttering a wakeword, e.g., "Alexa," a user might say "translate Hello, how are you into Spanish." After being converted to text, a natural language understanding (NLU) engine may interpret such an utterance as requesting that the phrase "Hello, how are you?" be translated from English into Spanish, and proceed accordingly.

In other implementations, the system can additionally or alternatively receive textual input through a keyboard or other input, and/or can determine the language into which an input sentence should be translated based upon another input, e.g., a drop down menu, a verbal command, or the like.

Figure 1:
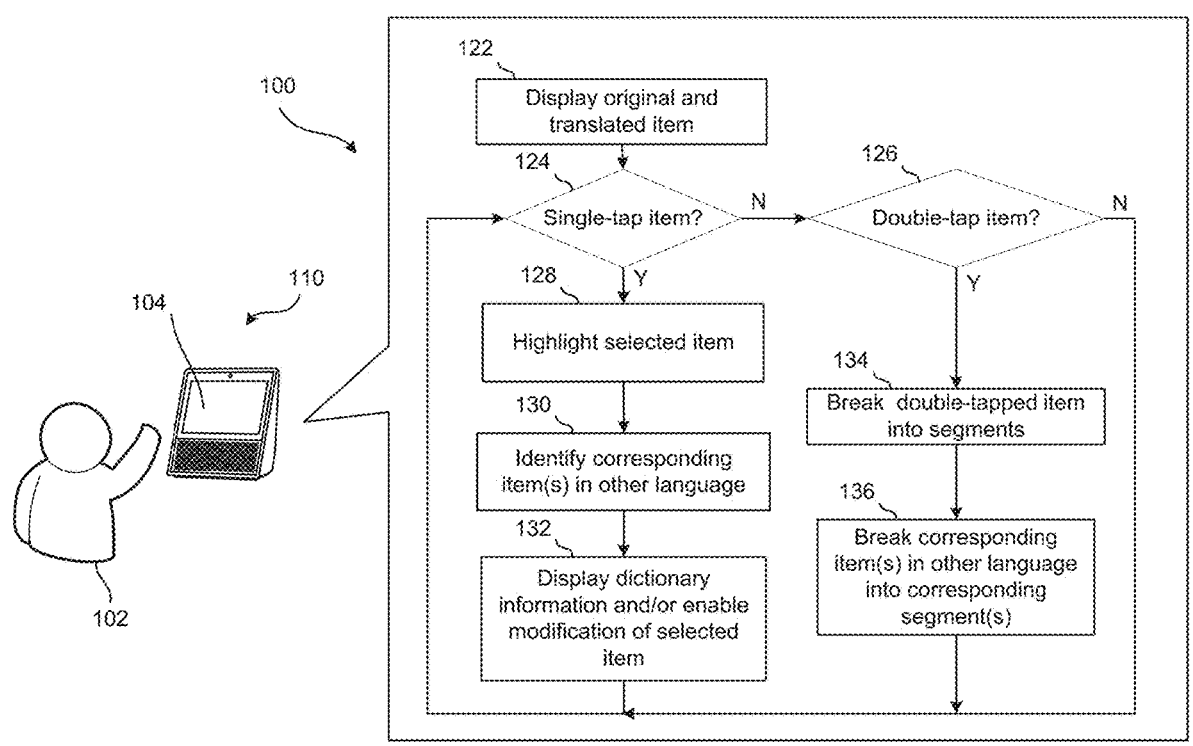
FIG. 1 is a block diagram and associated flow chart illustrating actions that can be taken by a user device in connection with some embodiments of the present disclosure.

FIG. 1 illustrates an example of a routine 100 that may be employed by a system described herein to interact with a user 102 operating a computing device 110. FIGS. 2A-D show examples of how the display 104 of the user device 110 may appear at various points of the routine 100. Although the example routine 100 begins (at step 122) with the display of original and translated versions of a sentence (e.g., screen 202 in FIG. 2A), it should be appreciated that additional steps may be employed prior to step 122, such as to detect and process a wakeword (e.g., "Alexa") and/or command (e.g., "translate . . . into Spanish"), as noted above, and such prior step(s) may, in some implementations, cause the routine 100 to be invoked.

In some implementations, the routine 100 may be executed exclusively, or nearly exclusively, by the user device 110 after the device 110 receives an ASR results lattice, a word/word group linking table, a translation results lattice, and/or dictionary information from one or more servers 320 (not illustrated in FIG. 1), as discussed in more detail below in connection with FIG. 10. In other implementations, execution of the routine 100 may be distributed between the device 110 and one or more servers 320, and/or information concerning ASR results, linking of words and word groups, translation results, and dictionary information can be retrieved from one or more servers on an as-needed basis.

When the original and translated versions of the sentence are displayed (shown in screen 202 of FIG. 2A), the user may take either of two actions with respect to them. In the example shown, the display 104 is a touch-screen and the user may either single-tap (step 124) or double-tap (step 126) one of the displayed items, e.g., by touching a screen with a fingertip or stylus. It should be appreciated, however, that other techniques can additionally or alternatively be used to signify different actions, and other user-interface mechanism can additionally or alternatively be employed to allow user interaction with the displayed items. For example, in some embodiments, a first action can involve a short tap (e.g., pressing and holding for a less than a threshold time period) and a second action can involve a long tap (e.g., pressing and holding for longer than a threshold time period). Other implementations may additionally or alternatively employ a mouse, touch pad, joystick, etc., to control a cursor on the display 104, and different types and/or sequences of button clicking or pushing actions (e.g., single-click/double click or long click/short click), or different physical buttons (e.g., left and right mouse buttons), can be employed to signify different actions. In yet other implementations, the system may additionally or alternatively accept verbal instructions, such as by processing a verbal statement such as "break apart" in the same way as the "double-tap" action discussed herein, or by processing a verbal statement identifying a segment for which information is to be displayed and/or selectable corrective actions are to be presented in the same way as the described "single-tap" action. A verbal command such as "next" could additionally or alternatively be processed by the system so as to cause the next segment in a displayed sentence to be selected and processed accordingly.

Although not specifically illustrated in FIGS. 1 and 2A-D, it should be appreciated that other user actions may also be processed by the system to cause the displayed screen to revert back to a prior state. For example, in some implementations, the system may cause broken apart sentences to be reconstituted into unitary sentences by tapping on a region of the screen outside that occupied by the text of the sentences, by tapping or clicking a dedicated back button or icon, or otherwise providing one or more types of input such as those described above.

Figure 2A:
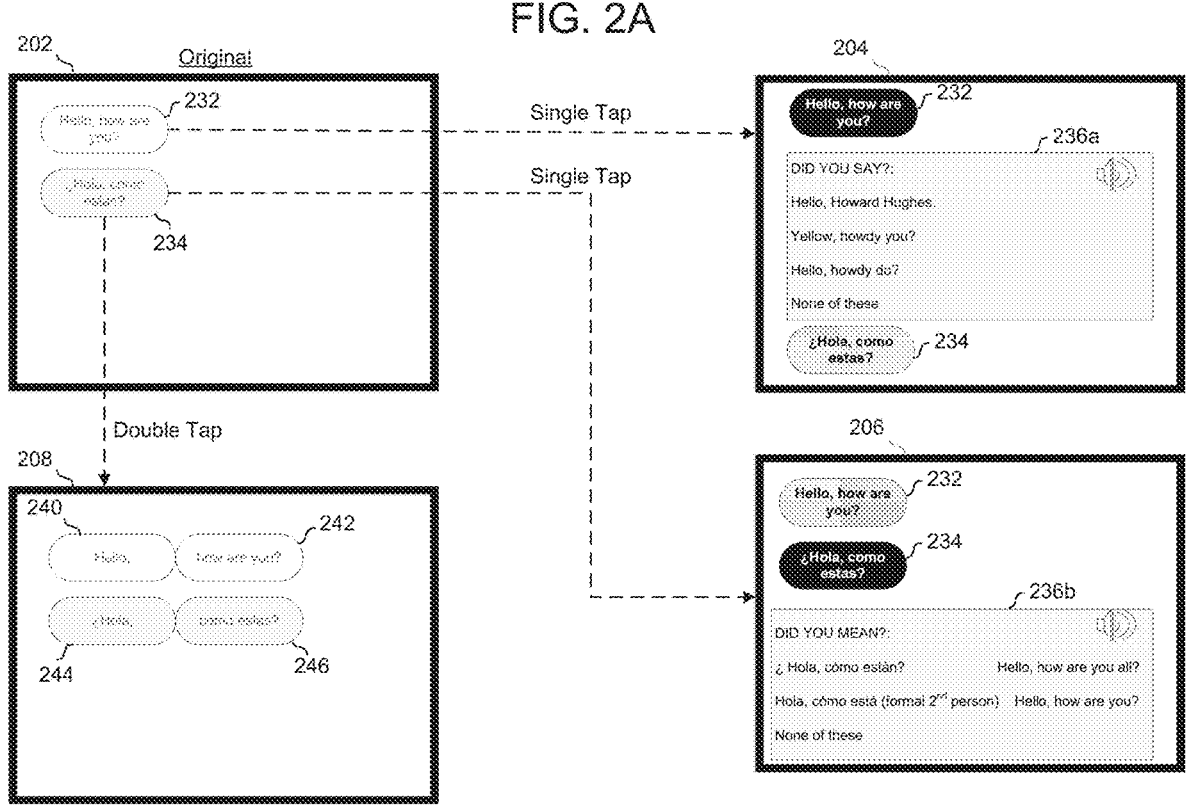

In the example routine of FIG. 1, in response to the device detecting a single-tap on one of the displayed items (step 124), the device may highlight (step 128) the selected item (in this case either the original sentence 232 or the translated sentence 234, as shown on screens 204 and 206 in FIG. 2A. In particular, screen 204 shows how the device may highlight the original sentence 232 upon detecting that the screen is single-tapped near the sentence. Screen 206 shows how the translated sentence 234 may be highlighted by the device in response to detecting a corresponding single-tap. In addition to highlighting the selected item, the device may identify (130) one or more corresponding items in the other language. On screen 204, the device highlights the translated sentence 234 (e.g., by using different shading, color, etc.) as corresponding to the highlighted original sentence 232. Similarly, on screen 206, the device identifies original sentence 232 as corresponding to the highlighted translated sentence 234. It should be appreciated that the highlighting of selected items and identification of corresponding items in the other language can be accomplished in any of numerous ways, and no particular technique or mechanism needs to be employed for these purposes. The highlighting of items can be accomplished, for example, by adjusting the color, shading, and/or shape of the text container for the highlighted item and/or by adjusting the color, font, size, style, etc., of the item's text characters. Identification of corresponding items in the other language can be accomplished using similar techniques.

As shown in FIG. 1, when a single-tap action is detected, in addition to highlighting a selected item (step 128) and identifying one or more corresponding items in the other language (step 130), the device 110 can, in some implementations, additionally or alternatively display further information about the selected item (step 132), e.g., a dictionary definition, and/or information allowing a user to somehow modify the selected item, e.g., by allowing the user to indicate the user actually said something other than what an ASR engine transcribed (e.g., see box 236a in FIG. 2A) or indicate text other than an interpretation a translation service provided (e.g., see box 236b in FIG. 2A). An example routine that may be employed to implement step 132 in FIG. 1 is described below in connection with FIG. 11.

In the illustrated example, when the device detects a double-tap (or other configured selection) corresponding to an item (step 126 in FIG. 1), both the item (step 134) and the corresponding items(s) in the other language (step 136) can be broken up into segments. In the example of FIG. 2A, for instance, a screen 208 results when one of the sentences 232 and 234 on the screen 202 is double-tapped. As seen on screen 208, the sentence 232 is broken into a first segment 240 containing the interjection "Hello," and a second segment 242 containing the phrase "How are you?" Similarly, on screen 208, the sentence 234 is broken into a first segment 244 corresponding to the segment 240 and containing the Spanish language interjection "¿Hola," and a second segment 246 corresponding to the segment 242 and containing the Spanish language phrase "como estas?"

In some implementations, the sentences 232 and 234 can be broken down based on the system identification of the respective phrases they contain (e.g., noun phrases, verb phrases, gerund phrases, infinitive phrases, appositive phrases, adverbial phrases, adjectival phrases, participial phrases, prepositional phrases, absolute phrases, etc.) and metadata or some other technique can be used to link together the individual words contained within each identified phrase. In some embodiments, either or both of the sentences 232 and 234 can, for example, be sent to a parsing service 310 (discussed in more detail below in connection with FIGS. 3 and 10) which can evaluate the sentence(s) using grammar rules and/or dictionaries for the language in which the sentence is written to identify the respective phrases it contains. Each set of words that are linked together as being part of the same phrase can then be displayed together as a different segment of the sentence, e.g., by being disposed within a common box or bubble that is separate from the boxes or bubbles of the other segments. For instance, screen 208 in FIG. 2A shows segments 240, 242, 244, and 248 as being disposed within respective bubbles. It should be appreciated that the respective segments can additionally or alternatively be identified in other ways, such as by inserting punctuation (e.g., "/", "—", "#", etc.) between the respective segments and/or by using different colors, fonts, etc. Also, although not specifically shown on screen 208 in FIG. 2A, it should be appreciate that each of the sentences 232 and 234 can be broken into three or more segments, for example, when each sentence contains three or more phrases or other groups of linked words. Because the segments 240, 242, 244, and 248 are concurrently identified in such a manner, the user can readily ascertain each of the segments of the original and translated sentences that is available for selection, either to be further broken apart or to display information or one or more options for correcting the selected segment.

Figure 2B:
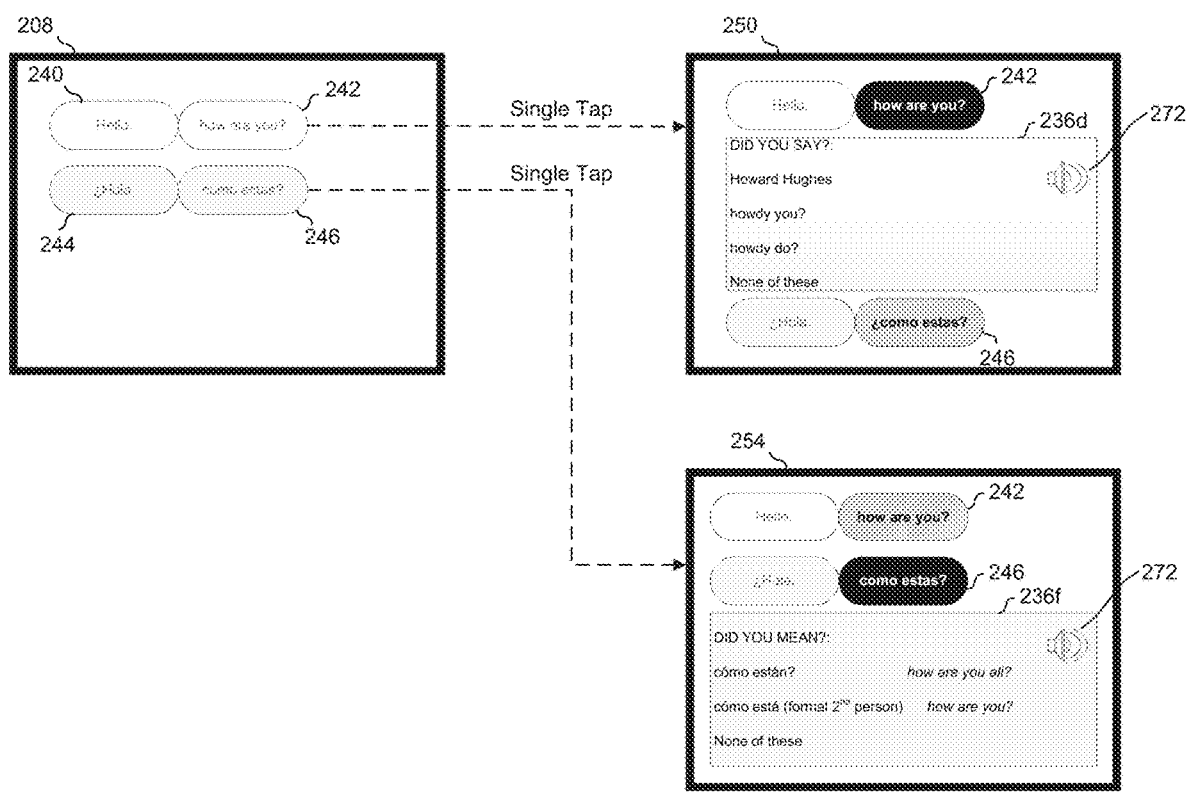
Figure 2D:
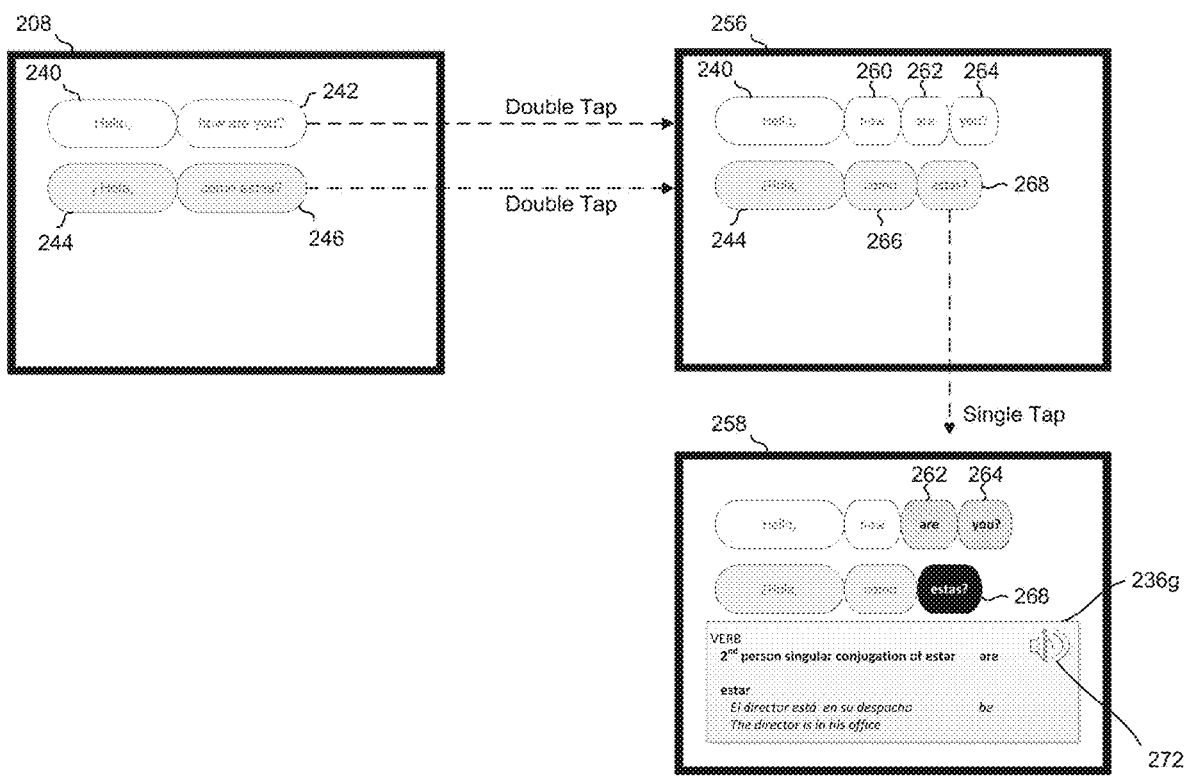

FIGS. 2B and 2C illustrate screens 248, 250, 252, and 254 that may be generated in response to the segments 240, 242, 244, and 246, respectively, being single-tapped. FIG. 2D illustrates a screen 256 that may be generated when multi-word segment 242 or multi-word segment 246 is double-tapped, as well as a screen 258 that may be generated when one of the single word segments on screen 256 is single-tapped. As seen in FIG. 2D, detecting a double-tap of one of multi-word segments 242 and 246 on screen 208 may cause the system to further break apart the selected segment and its counterpart segment(s) in the other, in this case into segments 260, 262, 264, 266, and 268 each containing a single word. On screen 256, three or more segments are identified for each of the two sentences (in this example by being disposed within respective bubbles) and the user is thus able to readily ascertain that any of the segments so identified can be selected to enable further functionality as described herein. The concurrent identification of three or more segments of a sentence in this manner represents an improvement systems in which only a single segment at a time is highlighted (e.g., by hovering a mouse over respective segments), as in such a system the user does not immediately know the identity of other selectable segments.

As for the single tap actions, in each instance, detecting a selection of a given segment in one language may cause the system to emphasize the selected segment (e.g., segment 240 on screen 248, segment 242 on screen 250, segment 244 on screen 252, segment 246 on screen 254, and segment 268 on screen 258) and also causes the system to identify the corresponding segment(s) in the other language (e.g., segment 244 on screen 248, segment 246 on screen 250, segment 240 on screen 252, segment 242 on screen 254, and segments 262 and 264 on screen 258). In some cases, multiple segments in one language can correspond to a single segment in the other language. For example, as shown on screen 258 in FIG. 2D, two English language segments 262 and 264 correspond to a single Spanish language segment 268. In this case, selecting either segment 262 or segment 264 may cause the system to emphasize both of the segments 262 and 264 in addition to causing the system to identify corresponding segment 268 in Spanish. Similarly, as illustrated on screen 258, selecting the segment 268 may cause segment 268 to be highlighted and also cause both of segments 262 and 264 to be identified as corresponding to highlighted segment 268.

Also, in the example implementation shown, single tapping on a segment may further cause the system to display certain information about the selected segment, e.g., in a box 236 between the segments. In the illustrated example, the type of information the system presents on the screens 248, 250, 252, 254, and 258 in response to a single tap depends on whether the selected segment contains a single word (e.g., segments 240, 244 and 268) or multiple words (e.g., segments 242 and 246). As illustrated by screens 248, 252, and 258, single-tapping a segment containing a single word may cause the system to present dictionary information for the selected segment in a box 236 (e.g., see boxes 236c, 236e, and 236g). As illustrated by screens 250 and 254, on the other hand, single-tapping a segment containing multiple words may cause the system to present options for correcting the selected segment. A similar process was described above in connection with screens 204 and 206 in FIG. 2A. For example, when the selected multi-word segment is in the language of the user whose voice was transcribed to create the selected segment, the system can present the user can with a list of alternate ASR results for the segment (e.g., see box 236a on screen 204 and box 236d on screen 250).

Additionally or alternatively, when the selected multi-word segment is a translation, e.g., generated by a translation service, of something the user said or typed, the system can present the user with a list of alternate translation results (as well as corresponding back-translations for those alternate translation results) for the segment (e.g., see box 236b on screen 206 and box 236f on screen 254). Further, in some implementations, information in a box 236 can be accompanied by an icon 272 or other identifier that can be selected to cause the system to generate audio feedback about the selected segment, e.g., by playing back retrieved audio data, or converting the text of the selected segment into a speech signal that is amplified and fed to a speaker. As noted previously, in some embodiments, the example routine shown in FIG. 11, which is discussed in more detail below, can be implemented as the step 132 of FIG. 1 to control the generation of additional information for display (e.g., in a box 236), and possible selection, when segments are single tapped or otherwise selected.

In some embodiments, the system allows the user to select both the source language of the input sentence and the destination language of the translation of the input sentence, e.g., using a drop-down menu, or stores profile settings on the device 110 or elsewhere that determine such parameters. The device 110 and/or a remote service may additionally or alternatively be configured to automatically identify the source language of the input sentence based on its content.

In some implementations, user selections of alternative ones of the N-best ASR results (e.g., via screen 204 or 250) may be used to train an automatic speech recognition (ASR) engine 304 (discussed below in reference to FIGS. 3 and 4) by appropriately adjusting one or more acoustic models and/or language models the ASR engine 304 employs, which models are discussed in more detail below in connection with FIG. 4. Similarly, in some implementations, user selections of alternative ones of the N-best MT results (e.g., via screen 206 or 254) may be used to train a translation service 312 (also not shown in FIG. 2) by appropriately adjusting one or more translation models, language models, and/or model weights the translation service 312 employs, which items are discussed in more detail below in connection with FIGS. 5-9.

Figure 3:
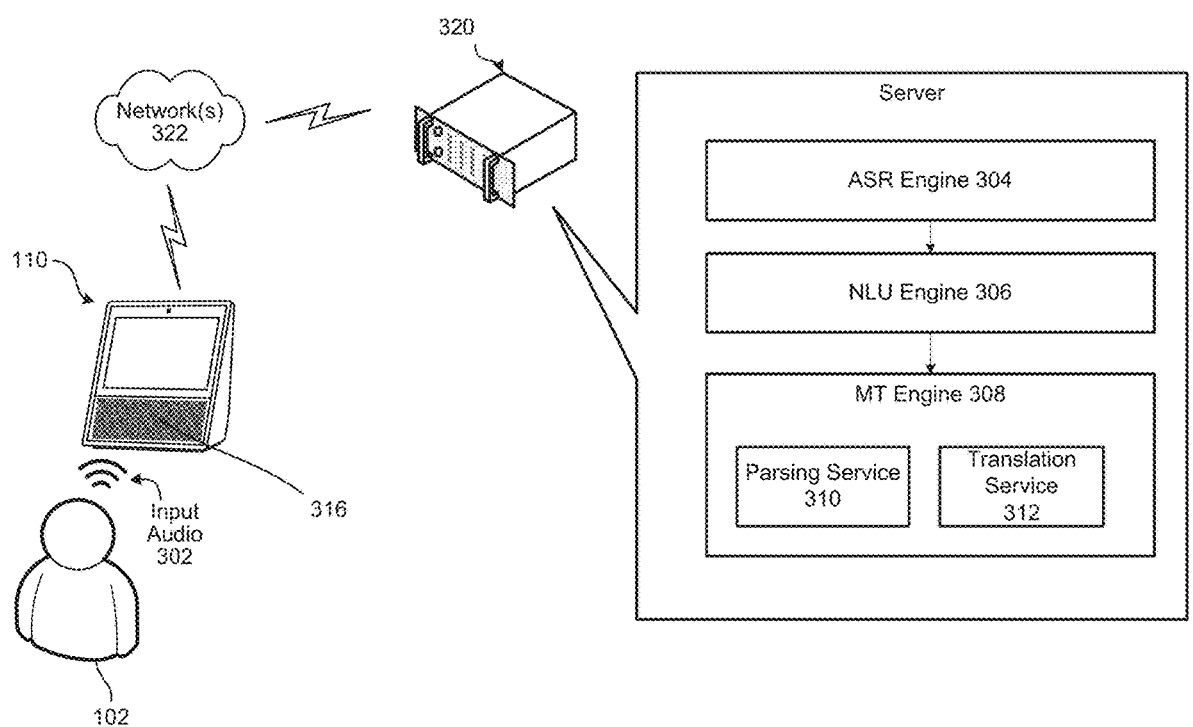
FIG. 3 is a block diagram illustrating components of a system in which aspects of the present disclosure can be employed in some embodiments.

FIG. 3 illustrates an example implementation of a voice-operable translation system in which an ASR engine 304, natural language understanding (NLU) engine 306, an MT engine 308, a parsing service 310, and a translation service 312 are all located on one or more servers 320. It should be appreciated that element 320 in FIG. 3 may represent any number of discrete servers or clusters or servers, and each of the software modules 304, 306, 308, 310, and 312 may either run on the same server or server group as one or more of the other modules, or may run on different servers or server groups. It should also be appreciated that, in some implementations, some or all of the software modules 304, 308, 306, 310, and 312 may instead run locally on a user device 110. The MT engine 308 may coordinate providing a translation using translation service 312 when the MT engine 308 receives NLU results indicating a translation is requested. The MT engine 308 may also coordinate parsing data using the parsing service 310 and coordinating interactions between the parsing service 310 and the translation service 312. Although the system is illustrated as the parsing service 310 and translation service 312 being incorporated into the MT engine 308, various other configurations of such system components may also be possible.

As shown, a user device 110 may include a microphone 316 and a display 104. Although not illustrated in FIG. 3, the user device may also include one or more microprocessors, memory/storage elements, and communications modules typical of conventional electronic devices, which components can operate, in conjunction with the microphone 316 and display 104, etc., to allow the user 102 to interact with the device 110 and allow the device 110 to communicate with one or more servers 320 via one or more network(s) 322 in the manner discussed herein. In some implementations, the display 104 may be a touch-screen with which the user may provide inputs to the device 110, e.g., by touching, tapping, swiping, etc. Additionally or alternatively, the device 110 may be provided with one or more other user input mechanisms (not illustrated), such as a keyboard, mouse, etc. Additional information concerning example embodiments of the user device 110 is provided below in connection with FIG. 12.

It should likewise be appreciated that each of the one or more servers 320 may also include one or more processors, memory/storage elements, and communications modules that can operate to execute the software modules 304, 306, 308, 310, and 312, communicate with the user device 110 via the network 322, and otherwise achieve the functionality discussed herein. Additional information concerning example embodiments of the server(s) 320 is provided below in connection with FIG. 13.

Figure 4:
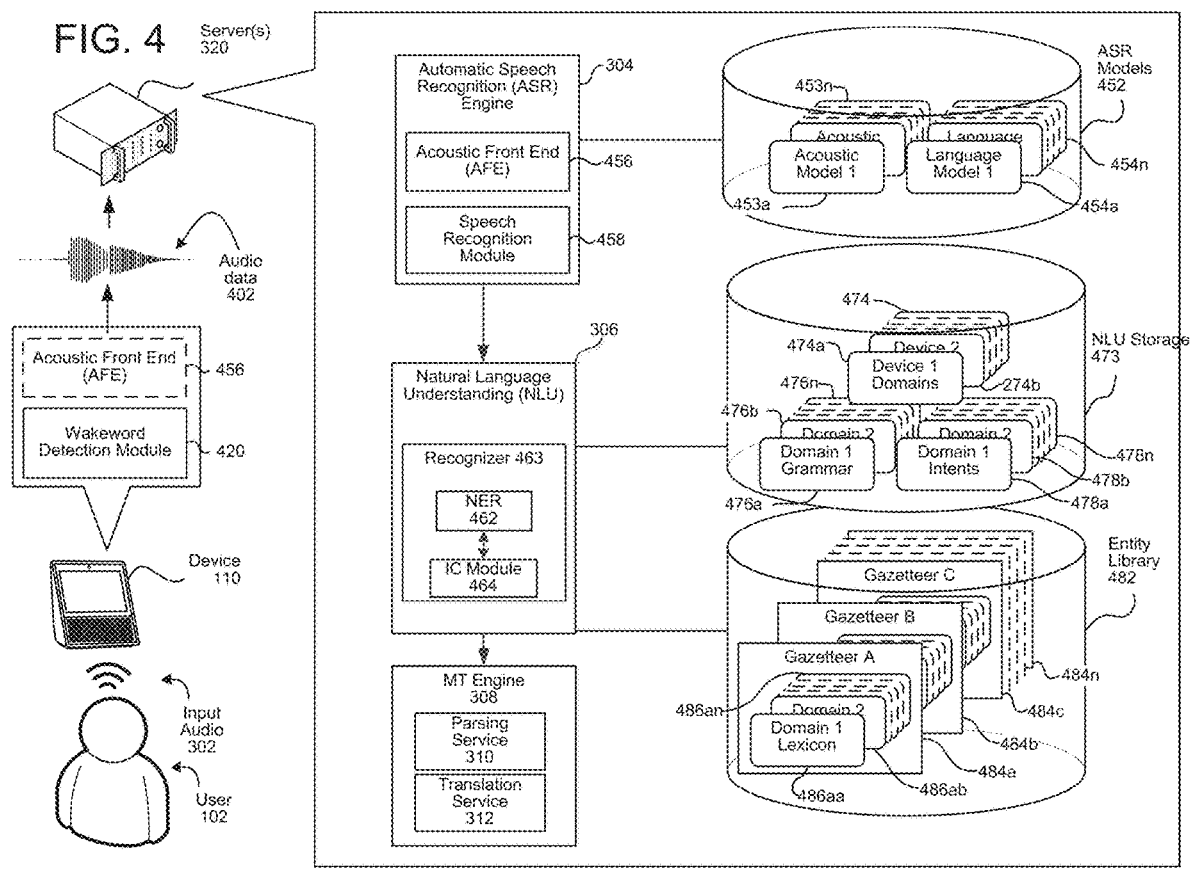
FIG. 4 is a block diagram illustrating components for speech processing and translation that may be employed with some embodiments of the present disclosure.

FIG. 4 is a conceptual diagram illustrating how a spoken utterance may be processed by an ASR engine 304 and an NLU engine 306, in some implementations. The various components illustrated may be located on the same or different physical devices. Communication between various components illustrated in FIG. 4 may occur directly or across a network 322. An audio capture component, such as the microphone 316 of a computing device 110, captures input audio 302 corresponding to a spoken utterance.

The device 110, using a wakeword detection module 420, may then processes the audio, or audio data corresponding to the audio, to determine if a keyword (such as a wakeword) is detected in the audio. Following detection of a wakeword, the device may send audio data 402 corresponding to the utterance, to a server 320 that includes an ASR engine 304. The audio data 402 may be output from an acoustic front end (AFE) 456 located on the device 110 prior to transmission. Or the audio data 402 may be in a different form for processing by a remote AFE 456, such as the AFE 456 located with the ASR engine 304.

The wakeword detection module 420 may work in conjunction with other components of the device 110, for example a microphone (not illustrated in FIG. 4) to detect keywords in audio 302. For example, the device 110 may convert audio 302 into audio data 402, and process the audio data 402 with the wakeword detection module 420 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 420 to perform wakeword detection to determine when a user intends to provide speech input to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 420 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making Other techniques for wakeword detection, such as those known in the art, may also be used.

Once the wakeword is detected, the local device 110 may "wake" and begin transmitting audio data 402 corresponding to input audio 302 to the server(s) 320 for speech processing by the ASR engine 304. The audio data 402 may include data corresponding to the wakeword, or the portion of the audio data corresponding to the wakeword may be removed by the local device 110 prior to sending.

In some implementations, other mechanisms can additionally or alternatively be used to indicate to or instruct the system that audio data is to be transmitted to an ASR engine 304. In some implementations, for instance, one or more soft keys or physical buttons on a user device 110 may be tapped, pressed, or otherwise selected to indicate when to start and/or stop sending audio data to the ASR engine 304.

Upon receipt by the server(s) 320, the audio data 402 may be passed to an ASR engine 304, and the ASR engine 304 may then transcribe the audio data 402 into text data representing words of speech contained in the input audio 302. The text data may then be used by other components for various purposes. A spoken utterance in the audio data 402 may be input to a processor configured to perform ASR, which may then interpret the spoken utterance based on a similarity between the spoken utterance and pre-established language models 454 stored in an ASR model knowledge base (e.g., ASR model storage 452). For example, the ASR engine 304 may compare the audio data 402 with models for sounds (e.g., subword units or phonemes) and sequences of sounds to identify words that match the sequence of sounds spoken in the spoken utterance of the audio data 402.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 453 stored in the ASR model storage 452), and a likelihood that a particular word that matches the sound would be included in the sentence at the specific location (e.g., using a language model 454 stored in the ASR model storage 452). Thus, each potential textual interpretation of the spoken utterance (i.e., hypothesis) is associated with a confidence score. Based on the considered factors and the assigned confidence score, the ASR engine 304 outputs the most likely text recognized in the audio data 402. The ASR engine 304 may also output multiple hypotheses in the form of a lattice or an N-best list with each hypothesis corresponding to a confidence score or other score (e.g., such as probability scores, etc.). Such an N-best lattice may include multiple portions corresponding to respective segments of the audio data 402, so that an N-best ASR results list may be derived for any such audio data segment and corresponding portion of the lattice.

The device or devices included in the ASR engine 304 may include an AFE 456 and a speech recognition module 458. The AFE 456 transforms the audio data 402, captured by the microphone (not illustrated in FIG. 4), into data for processing by the speech recognition engine 458. The speech recognition module 458 compares the speech recognition data with acoustic models 453, language models 454, and other data models and information for recognizing the speech conveyed in the audio data 402. The AFE 456 may reduce noise in the audio data 402 and divide the digitized audio data 402 into frames representing time intervals for which the AFE 456 determines a number of values (i.e., features) representing qualities of the audio data 402, along with a set of those values (i.e., a feature vector or audio feature vector) representing features/qualities of the audio data 402 within each frame. Many different features may be determined, as known in the art, and each feature represents some quality of the audio that may be useful for ASR processing. A number of approaches may be used by the AFE 456 to process the audio data 402, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition module 458 may process data output from the AFE 456 with reference to information stored in the ASR model storage 452. Alternatively, post front-end processed data (e.g., feature vectors) may be received by the device executing ASR processing from another source besides the internal AFE 456. For example, the computing device 110 may process audio data 402 into feature vectors (e.g., using an on-device AFE 456) and transmit that information to the server(s) 320 across the network 322 for ASR processing. Feature vectors may arrive at the server(s) 320 encoded, in which case they may be decoded prior to processing by the processor executing the speech recognition module 458.

The speech recognition module 458 may attempt to match received feature vectors to language phonemes and words as known in the stored acoustic models 453 and language models 454. The speech recognition module 458 may compute recognition scores for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving a likelihood that the ASR engine 304 will output speech results that make sense grammatically.

The speech recognition module 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition module 458 to other processing components, which may be local to the device performing ASR and/or distributed across the network(s) 322. For example, ASR results in the faun of a single textual representation of the speech, an N-best list including multiple hypotheses and respective scores, lattice, etc., may be sent to a natural language understanding (NLU) engine 306 for processing, such as conversion of the text data into commands for execution, either by a speech-controlled device 110, by the machine translation (MT) engine 308, or another module on the server(s) 320, or by another device (e.g., a server running a search engine, etc.)

The device performing NLU processing (e.g., a server 320) may include various components, including potentially dedicated processor(s), memory, storage, etc. As shown in FIG. 4, an NLU engine 306 may include a recognizer 463 that includes a named entity recognition (NER) module 462 which is used to identify portions of query text that correspond to a named entity that may be recognizable by the system. A downstream process called named entity resolution actually links a text portion to an actual specific entity known to the system. To perform named entity resolution, the system may utilize gazetteer information (484a-484n) stored in entity library storage 482. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways. The NER module 462 (or other component) may also determine whether a word refers to an entity that is not explicitly mentioned in the utterance text, for example "him," "her," "it" or other anaphora, exophora or the like.

Generally, the NLU process takes textual input (such as processed from ASR engine 304 based on the utterance input audio 302) and attempts to make a semantic interpretation of the text. That is, the NLU process determines the meaning behind the text based on the individual words and then implements that meaning. NLU engine 306 interprets a text string to derive an intent or a desired action from the user as well as the pertinent pieces of information in the text that allow a device (e.g., device 110) to complete that action. For example, if a spoken utterance is processed using ASR engine 304 and outputs the text "call mom" the NLU process may determine that the user intended to activate a telephone in his/her device and to initiate a call with a contact matching the entity "mom" (which may involve a downstream command processor 490 linked with a telephone application).

The NLU may process several textual inputs related to the same utterance. For example, if the ASR engine 304 outputs N text segments (as part of an N-best list), the NLU may process all N outputs to obtain NLU results.

As will be discussed further below, the NLU process may be configured to parse and tag information to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 472.

To correctly perform NLU processing of speech input, an NLU engine 306 may be configured to determine a "domain" of the utterance so as to determine and narrow down which services offered by the endpoint device (e.g., server 320 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 462 receives a query in the faun of ASR results and attempts to identify relevant grammars and lexical information that may be used to construe meaning. To do so, the NLU engine 306 may begin by identifying potential domains that may relate to the received query. The NLU storage 473 includes a databases of devices (474a-474n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Speaker ID, or Household ID, or some other indicator.

In NLU processing, a domain may represent a discrete set of activities having a common theme, such as "shopping", "music", "calendaring", etc. As such, each domain may be associated with a particular recognizer 463, language model and/or grammar database (476a-476n), a particular set of intents/actions (478a-478n), and a particular personalized lexicon (486). Each gazetteer (484a-484n) may include domain-indexed lexical information associated with a particular user and/or device. For example, the Gazetteer A (484a) includes domain-index lexical information 486aa to 486an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 464 parses the query to determine an intent or intents for each identified domain, where the intent corresponds to the action to be performed that is responsive to the query. Each domain is associated with a database (478a-478n) of words linked to intents. For example, a music intent database may link words and phrases such as "quiet," "volume off," and "mute" to a "mute" intent. The IC module 464 identifies potential intents for each identified domain by comparing words in the query to the words and phrases in the intents database 478. Traditionally, the determination of an intent by the IC module is performed using a set of rules or templates that are processed against the incoming text to identify a matching intent.

In order to generate a particular interpreted response, the NER 462 applies the grammar models and lexical information associated with the respective domain to actually recognize a mention one or more entities in the text of the query. In this manner the NER 462 identifies "slots" (i.e., particular words in query text) that may be needed for later command processing. Depending on the complexity of the NER 462, it may also label each slot with a type of varying levels of specificity (such as noun, place, city, artist name, song name, or the like). Each grammar model 476 includes the names of entities (i.e., nouns) commonly found in speech about the particular domain (i.e., generic terms), whereas the lexical information 486 from the gazetteer 484 is personalized to the user(s) and/or the device. For instance, a grammar model associated with the shopping domain may include a database of words commonly used when people discuss shopping.

The intents identified by the IC module 464 are linked to domain-specific grammar frameworks (included in 476) with "slots" or "fields" to be filled. Each slot/field corresponds to a portion of the query text that the system believes corresponds to an entity. For example, if "play music" is an identified intent, a grammar (476) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 462 may parse the query to identify words as subject, object, verb, preposition, etc., based on grammar rules and/or models, prior to recognizing named entities. The identified verb may be used by the IC module 464 to identify intent, which is then used by the NER module 462 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 462 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 464 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 462 may search the database of generic words associated with the domain (in the knowledge base 472). So for instance, if the query was "play songs by the rolling stones," after failing to determine an album name or song name called "songs" by "the rolling stones," the NER component 462 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

When the NLU engine 306 indicates an incoming message is to be translated into a particular language, such as in response to the utterance "Alexa translate hello how are you into Spanish," the output data from the NLU processing (which may include tagged text, commands, etc.) may be sent to the MT engine 308, with the MT engine 308 being instructed to translate the phrase "hello, how are you" into Spanish. An example implementation of a routine 1000 that may be executed by the MT engine 308 is described below in connection with FIG. 10.

In some implementations, the system may include command processors in addition to the MT engine 308, and the destination command processor may be determined based on the NLU output. For example, if the NLU output includes a command to play music, the destination command processor may be a music playing application, such as one located on device 110 or in a music playing appliance, configured to execute a music playing command. If the NLU output includes a search utterance (e.g., requesting the return of search results), the command processor selected may include a search engine processor, such as one located on a search server, configured to execute a search command and determine search results, which may include output text data to be processed by a text-to-speech engine and output from a device as synthesized speech.

If the NLU output includes a command to obtain content from another source, the command processor or other component, through an application program interface (API), may send a request for such content to an appropriate application server or other device. The application server may send the content, for example audio content, to the command processor or other component. In certain instances, the output content sent from the application server may include a link that may be sent from the server(s) 320 to the local device 110 closest to the user so that device 110 may use the link to access the output content desired by the user. In this case the output content data may be sent from the application server through the server(s) 320 to the nearest device 110 or directly from the application server to the nearest device 110 (or some other destination appropriate to the command). In certain instances the output content data may be audio data (such as music, a prerecorded reading of an audio book, etc.) and thus may be output through a speaker of the local device 110. In other instances the output content data may be text data (either generated by the application server or by a component of the server(s) 320) that needs to be converted into audio data prior to being output to a user using the local device 110.

Figure 5:
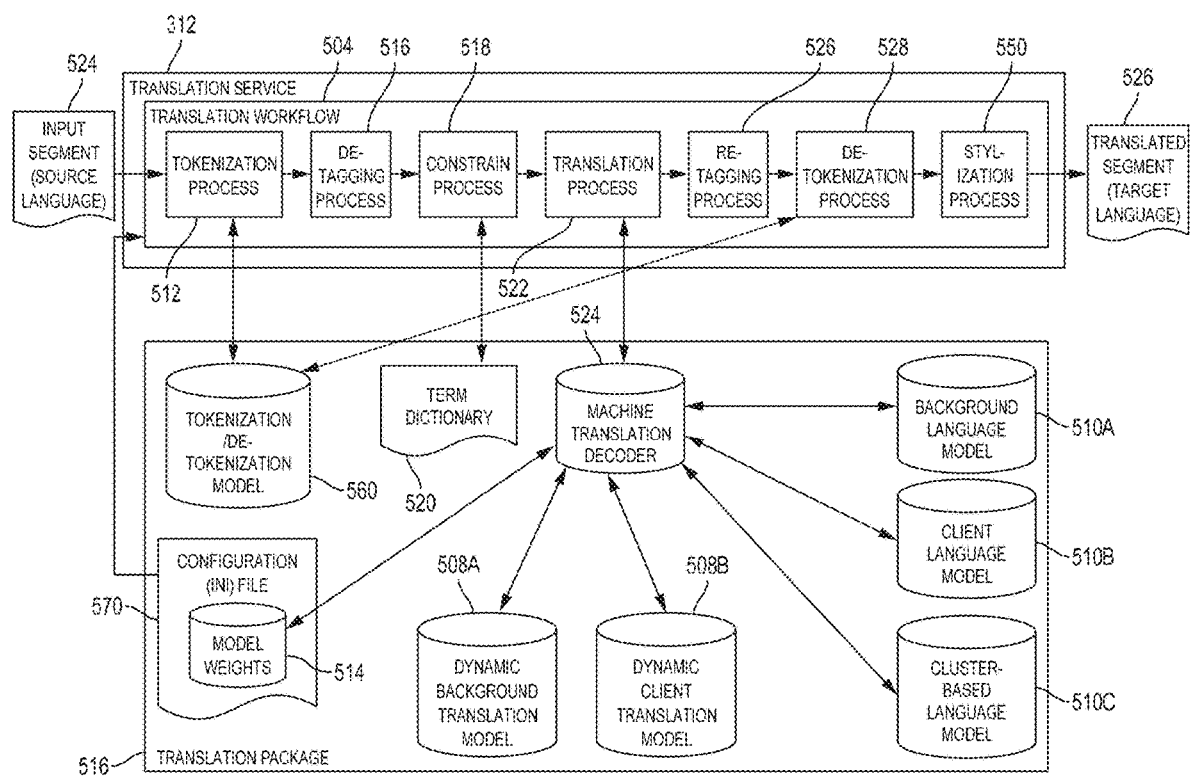
FIG. 5 is a block diagram illustrating components of a translation service that may be employed with some embodiments of the present disclosure.

FIG. 5 is a system architecture diagram showing aspects of a translation service 312 that can be used to translate input segments 524 of text, e.g., text from the NLU engine 306, into output segments 526 of text using translation models 508 and language models 510, according to one configuration disclosed herein. As shown, the translation service 312 may employ a translation package 516. The translation package 516 may include a background language model 510A, a client language model 510B, and a cluster-based language model 510C. A combined language model (not shown in FIG. 5) can additionally or alternatively be utilized in some configurations.

The translation package 516 may also include a dynamic background translation model 508A and a dynamic client translation model 508B. A combined translation model (not shown in FIG. 5) can additionally or alternatively be utilized in some configurations. The translation package 516 can further include a configuration file 570 that includes model weights 514. The configuration file 570 might also specify other preferences regarding the manner in which translations are to be performed.

In some configurations, the translation package 516 also includes a tokenization/de-tokenization model 560. The tokenization/de-tokenization model 560 can be generated by a tokenization process and utilized at translation time to tokenize and/or de-tokenize an input segment 524 that is to be translated. The translation package 516 can also include a term dictionary 520 that includes translations for client-specific words or phrases. The term dictionary 520 can be utilized to ensure that specified words or phrases are translated in the same manner regardless of the context within which they appear.

The illustrated translation package 516 also includes a machine translation decoder 524. In one particular configuration, the machine translation decoder 524 is the MOSES open-source statistical machine translation system. Other statistical machine translation decoders can be utilized in other configurations. The configuration file 570 can include data for configuring the machine translation decoder 524 in various ways. Additional details regarding the MOSES open-source statistical machine translation system can be found at statmt.org/moses/.

As shown in FIG. 5 and described briefly above, the translation service 312 can utilize the translation package 516 when translating an input segment 524 in a source language to a translated segment 526 in a target language. In particular, the translation service 312 is configured in some implementations to implement a translation workflow 504 in order to perform the translation. The configuration file 570 can include data that specifies various aspects regarding the operation of the translation workflow 504.

As shown, the translation workflow 504 begins with the tokenization process 512. The tokenization process 512 tokenizes the input segment 524 by breaking the text into discrete units. For example, and without limitation, the tokenization process 512 can separate punctuation characters, perform normalization on the text, and break apart contractions.

The tokenization process 512 provides the tokenized input segment 524 to the de-tagging process 504. The de-tagging process 504 removes any markup tags (e.g. HTML tags) that appear in the input segment 524. As will be described in greater detail below, the removed markup tags can be added to the translated segment 526 by the re-tagging process 526. In this manner, formatting contained in the input segment 524 can be preserved in the translated segment 526.

The tokenized and de-tagged input segment 524 is provided to the constrain process 518 in one configuration. The constrain process 518 utilizes the term dictionary 520 to translate specified words or phrases identified in the Willi dictionary 520. As mentioned above, this enables a specific translation of a word or phrase to be performed regardless of the context in which the word or phrase appears. Other types of constraints can also be utilized in other configurations instead of or in addition to the term dictionary 520.

The next step in the translation workflow 504 is the translation process 522. The translation process 522 utilizes the machine translation decoder 524 to translate the input segment 524 into the target language. In this regard, the machine translation decoder 524 can utilize the dynamic background translation model 508A, the dynamic client translation model 508B, and a combined translation model, if present, to dynamically learn a model that can be utilized to translate the input segment 524 specifically to one or more candidate translations of the input segment 524 in the target language.

The translation models 508 can provide various feature scores for the candidate translations. Similarly, the machine translation decoder 524 can utilize the background language model 510A, the client language model 510B, and the cluster-based language model 510C to also generate feature scores for the candidate translations. The model weights 514 can then be utilized to weight the various contributions from the language models 510 and the translation models 508. The weighted feature scores can then be utilized to combine various candidate translations to form a translation of the input segment 524. In some implementations, the weighted feature scores can be used to identify the N-best translations of the input segment along with associated scores, etc. Like the ASR engine 304, the translation process 522 may also output multiple hypotheses (and back-translations of the same) in the form of a lattice with each hypothesis corresponding to a confidence score or other score (e.g., such as probability scores, etc.). Such an N-best translation results lattice may include multiple portions corresponding to respective sub-segments of the input segment 524, so that an N-best translation results list (including corresponding back-translations of items on the list) may be derived for any such sub-segment and corresponding portion of the lattice.

As mentioned briefly above, the re-tagging process 526 can then be performed to re-apply any formatting removed from the input segment 524 by the de-tagging process 504. Subsequently, the de-tokenization process 528 can utilize the tokenization/de-tokenization model 514 to de-tokenize the translated segment 526. For example, and without limitation, the de-tokenization process 528 can attach punctuation to the translated segment 526 that was separated by the tokenization process 512. As another example, the de-tokenization process 528 can merge contractions that were broken apart by the tokenization process 512. The de-tokenization process 528 can also perform other functionality not specifically mentioned herein.

In one configuration, a stylization process 550 is also performed as a part of the translation workflow 504. The stylization process 550 utilizes pre-defined lists of client-specific rules to stylize the translated segment 526. For example, and without limitation, spaces can be inserted before measurements or a certain type of quotation marks can be utilized for a specific language. Other types of client-specific stylizations that are to be applied to the translated segment 526 can also be defined and utilized in a similar manner.

Once the translation workflow 504 has completed, the translation results can be returned in response to the request to translate the input segment 524 from the source language to the target language. For example, translation results in the form of a single translation of the input segment 524, an N-best list including multiple hypotheses, corresponding back-translations, and respective scores, an N-best translation results lattice containing multiple hypotheses, corresponding back-translations, and respective scores for respective sub-segments of the input segment 524, etc., may be sent to the MT engine 308 discussed above, which may be located on the same or a different server than the translation service 312.

Figure 6:
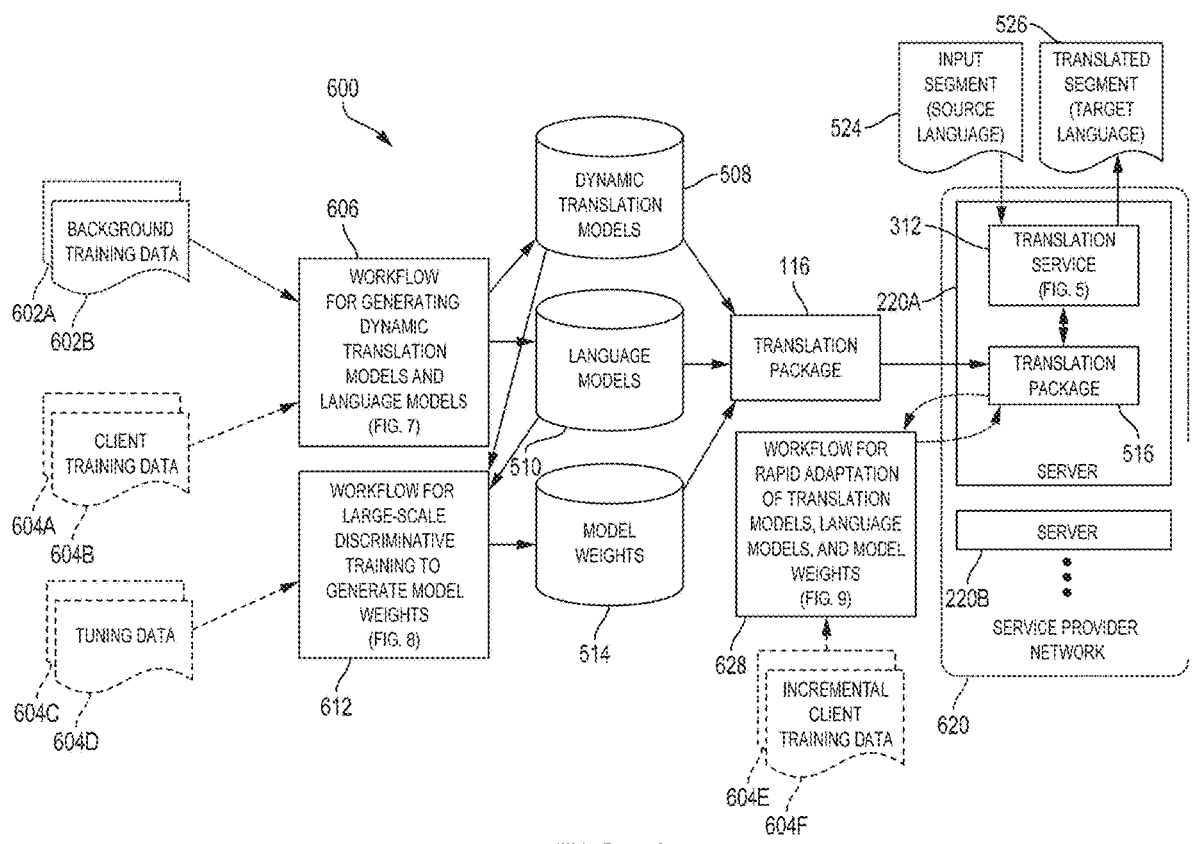
FIG. 6 is a block diagram showing an overview of the configuration and operation of a machine learning system that can be used to generate a translation package used by the translation service shown in FIG. 5.

FIG. 6 is a system architecture diagram showing an overview of the configuration and operation of a machine learning system 600 that is configured with rapid adaptation capabilities. The system of FIG. 6 can be utilized to create the translation package 516 that can be utilized by the translation service 312 to translate an input segment 524, or segments, expressed in a source language (e.g. English) to a translated segment 526, or segments, in a target language (e.g. Spanish).

In order to generate the translation package 516, a workflow 606 is performed for generating dynamic translation models 508 for the source and target languages, and for generating language models 510 for the target language. The workflow 606 takes non-domain-specific background training data 602 as input. The background training data 602A, for example, may be a collection of sentences or paragraphs expressed in the source language, and the background training data 602B may be the same collection of sentences or paragraphs that have been expressed in the target language.

In a similar fashion, the workflow 606 also takes as input in-domain client training data 604. As with the background training data 602, the client training data 604A may be a collection of sentences or paragraphs expressed in the source language, and the client training data 604B may be the same collection of sentences or paragraphs that have been expressed in the target language. In one specific implementation, the non-domain-specific background training data 602 is translations of books and the in-domain client training data 604 are product descriptions for products offered through an e-commerce merchant. Other types of in-domain and out-of-domain training data can be utilized in other configurations.

As shown in FIG. 6, the output of the workflow 606 is one or more dynamic translation models 508 for translating between the source and target languages, and one or more language models 510 for the target language. Additional details regarding the workflow 606 for generating the dynamic translation models 508 and the language models 510 are provided below with regard to FIG. 7.

In order to generate the translation package 516, a workflow 612 is also executed for performing large-scale discriminative training to generate model weights 514 for the dynamic translation models 508 and the language models 510. In one configuration, the margin relaxed infused algorithm ("MIRA") is utilized to perform the large-scale discriminative training Other algorithms can also be utilized in other configurations.

As illustrated in FIG. 6, the workflow 612 takes additional in-domain client tuning data 604C and 604D as input. The additional in-domain client tuning data 604C and 604D can include sentences, paragraphs, or other phrases in the source and target languages that were not included in the client training data 604A and 604B. Additionally, the additional in-domain client tuning data 604C and 604D may include text of a type that is similar to the input segments 524 that will be encountered during production use of the machine translation system 600. Additional details regarding the generation of the model weights 514 will be provided below with regard to FIG. 8.

Once the model weights 514 have been generated, the dynamic translation models 508, the language models 510, and the model weights 514 are added to the translation package 516. The translation package 516 can then be deployed to one or more servers 320 in a service provider network 620 and utilized with an translation service 312 to perform translations, as discussed above in connection with FIGS. 2 and 3. The service provider network 620 may, for example, be a computing network configured to provide computing resources on a permanent or an as-needed basis. Among other types of functionality, the computing resources provided by the service provider network 620 can be utilized to implement various network services described herein, such as the translation service 312 used to perform translations. The computing resources provided by the service provider network 620 can include various types of computing resources, such as data processing resources like virtual machine ("VM") instances, data storage resources, networking resources, data communication resources, network services, and the like.

As discussed briefly above, the service provider network 620 can be configured to execute various types of network services. For example, and without limitation, the service provider network 620 can execute the ASR engine 304 shown in FIG. 4 and the MT engine 206 shown in FIG. 5. As discussed briefly above, the translation service 312 is a network service that executes in the service provider network 620 in one particular configuration. The translation service 312 may, for example, expose an interface, such as a Web services interface, through which callers (e.g., the MT engine 308) can request translation of an input segment 524 in a source language to a translated segment 526 in a target language. In response to receiving such a request, the translation service 312 is configured to utilize the dynamic translation models 508, the language models 510, and the model weights 514 contained in the translation package 516 to perform the requested translation. Additional details regarding the operation of the translation service 312 are discussed above in connection with FIG. 5.

In one particular configuration, a workflow 628 can also be performed for rapid adaptation of the dynamic translation models 508, the language models 510, and the model weights 514. In order to perform rapid adaption of these components, the workflow 628 takes as input incremental in-domain client training data 604E-604F. For example, translations generated by the statistical machine translation system shown in FIG. 6 might be post-edited by human translators to ensure that they are accurate translations of the associated input segment. The input segments and their corresponding post-edited translations can then be utilized as the incremental client training data 604E-604F for use in rapidly adapting the dynamic translation models 508, the language models 510, and the model weights 514.

In one particular configuration, the machine translated segments 526 can be presented to users of a Web site, such as an e-commerce site. For example, and without limitation, an appropriate UI can be presented to users of an e-commerce site that include machine translated segments 526 of product or service descriptions or related content. The UI can also provide UI controls to query the user as to whether the translation appears correct and, if not, to provide the correct translation. The human post-edited translations can then be utilized as the incremental client training data 604E-604F for use in rapidly adapting the dynamic translation models 508, the language models 510, and the model weights 514 in the manner described above. In this regard, it should be appreciated that other types of UIs can be utilized in other environments for obtaining human post-edited translations for use as the incremental client training data 604.

In some implementations, user corrections of translations performed by the translation service 312, e.g., a user's selection of an alternate N-best MT result, as discussed above in connection with screen 206 in FIG. 2A and screen 254 in FIG. 2B, can be used as the incremental client training data 604 that can be used to rapidly adapt the dynamic translation models 508, the language models 510, and the model weights 514 in the manner described.

The workflow 628 can also generate an updated translation package and deploy the updated translation package to the service provider network 620 in place of a previous version of the translation package 516. Additional details regarding the workflow 628 for performing rapid adaptation of the dynamic translation models 508, the language models 510, and the model weights 514 will be provided below with regard to FIG. 9.

It should be appreciated that the workflows 606 and 612 may be implemented in one particular configuration utilizing the open-source DUCTTAPE workflow management system. Additional software components can then be utilized to encapsulate the resulting language models 510, translation models 508, model weights 514, and other components into a translation package 516, such as a software container, that can be deployed into a production environment, such as the service provider network 620. Once deployed, the translation package 516 can be utilized to respond to translation requests received from service clients.

It should also be appreciated that the various models shown in FIGS. 5 and 6 are merely illustrative and that other models and their associated model weights can be utilized in a similar manner to that described herein. For example, and without limitation, one or more reordering models (not shown in FIGS. 5 and 6) may additionally or alternatively be utilized in some configurations. In other configurations, multiple domain-specific models can be utilized. Other configurations can also be utilized without departing from the spirit and scope of the disclosure presented herein.

Figure 7:
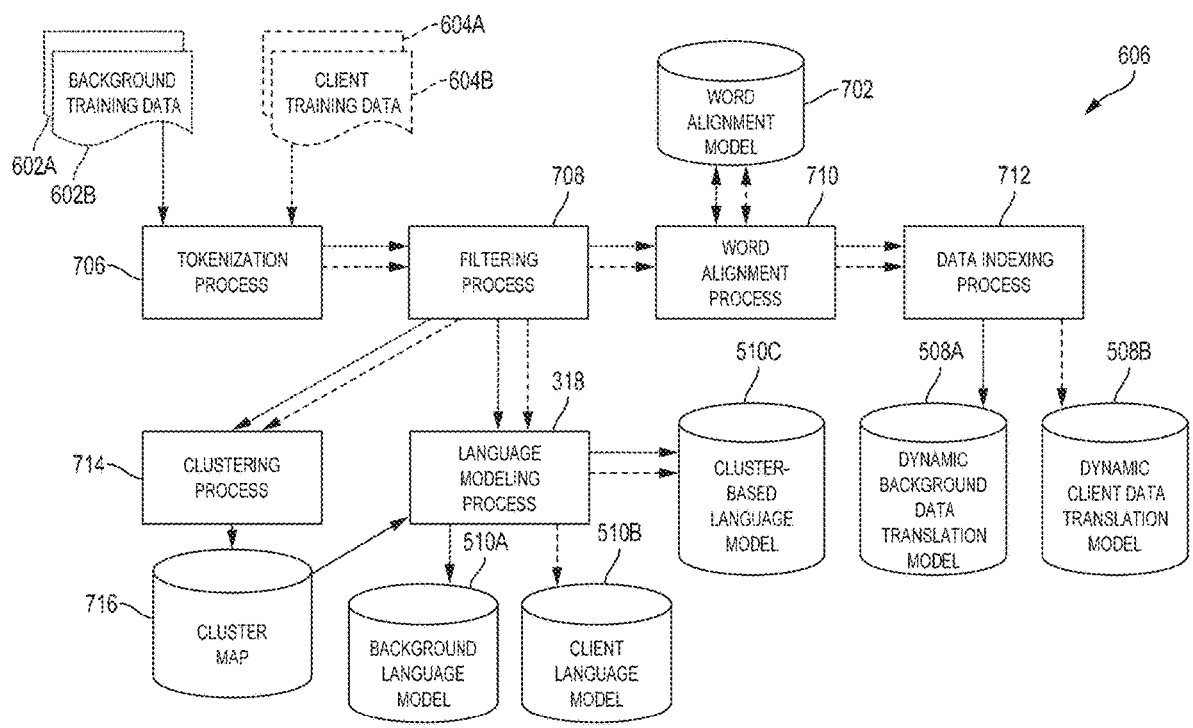
FIG. 7 is a block diagram showing aspects of the operation of the workflow shown in FIG. 6 for generating dynamic translation models and language models.

FIG. 7 is a system architecture diagram showing aspects of the operation of the workflow 606 shown in FIG. 6 for generating dynamic translation models 508 and language models 510, according to one configuration disclosed herein. As discussed briefly above, the workflow 606 takes as input non-domain-specific background training data 602. The background training data 602A, for example, may be a collection of sentences or paragraphs expressed in the source language, and the background training data 602B may be the same collection of sentences or paragraphs that have been expressed in the target language. The background training data 602A and 602B may be referred to herein collectively as "background training data 602."

In a similar fashion, the workflow 606 also takes as input in-domain client training data 604. As with the background training data 602, the client training data 604A may be a collection of sentences or paragraphs expressed in the source language, and the client training data 604B may be the same collection of sentences or paragraphs that have been expressed in the target language. The client training data 604A and 604B may be referred to herein collectively as "client training data 604." The dotted lines in FIG. 7 represent the flow of the background training data 602 while the dashed lines represent the flow of the client training data 604.

The first step of the workflow 606 illustrated in FIG. 7 is the tokenization process 706. The tokenization process 706 tokenizes both the background training data 602 and the client training data 604 by breaking the text into discrete units. For example, and without limitation, the tokenization process 706 can separate punctuation characters, perform normalization on the text, and break apart contractions. The tokenized background training data 602 and client training data 604 is then provided to the filtering process 708.

The filtering process 708 removes text from the tokenized background training data 602 and the client training data 604 that is not suitable for inclusion in the dynamic translation models 508 or for use in training the language models 510. For example, and without limitation, the filtering process 708 might remove very long sentences that are not useful for creating the language models 510. Similarly, the filtering process 708 can remove mismatched sentences that are not appropriate for use in the dynamic translation models 508. Other types of filtering can be performed. The tokenized and filtered background training data 602 and client training data 604 is then provided to the word alignment process 710. The tokenized and filtered background training data 602 and client training data 604 in the target language is also provided to the language modeling process 718 and the clustering process 714. Each of these processes is described in detail below.

The word alignment process 710 utilizes unsupervised machine learning to learn a word alignment model 702 describing word-level correspondences between the training data in the source language and the training data in the target language. For example, and without limitation, the word alignment process 710 can learn word-level correspondences between the out-of-domain background training data 602A in the source language and the background training data 602B in the target language. Similarly, the word alignment process 710 can learn word-level correspondences between the in-domain client training data 604A in the source language and the client training data 604B in the target language. The word alignment model 702 can be saved for use during the rapid retraining process described below with regard to FIG. 9. The tokenized, filtered, and word-aligned background training data 602 and client training data 604 is then provided to the data indexing process 712.

The data indexing process 712 indexes the tokenized, filtered, and word-aligned background training data 602 to create a dynamic background data translation model 508A. The data indexing process 712 also indexes the tokenized, filtered, and word-aligned client training data 604 to create a dynamic client data translation model 508B. In some configurations, a combined translation model (not shown in FIG. 7) is generated using both the background training data 602 and the client training data 604.

The indexed background training data 602 and client training data 604 stored in the dynamic background translation model 508A and the dynamic client data translation model 508B, respectively, can be searched at translation time to generate candidate translations of phrases in an input segment 524. In one particular implementation, the translation models 508 are implemented utilizing suffix array data structures. Other data structures can be utilized in other configurations to index the background training data 602 and the client training data 604 in a manner suitable for efficient searching at run time. As will also be described in greater detail below, incremental background and client training data can be added to the dynamic background translation model 508A and the dynamic client data translation model 508B, respectively, without rebuilding the entire index. Details regarding this process are provided below with regard to FIG. 9.

As discussed briefly above, the tokenized and filtered background training data 602 and client training data 604 in the target language is also provided to the language modeling process 718. The language modeling process 718 utilizes the background training data 602 to generate a background language model 510A for the target language. The language modeling process 718 also utilizes the client training data 604 to generate a client language model 510B for the target language. In some configurations, the language modeling process 718 also generates a combined language model (not shown in FIG. 7) for the target language utilizing both the background training data 602A and the client training data 602B. As will be described in greater detail below, the background language model 510A, the client language model 510B, and the combined language model, if utilized, can generate feature scores for different attributes of the translations generated by the statistical machine translation system described herein.

As also discussed briefly above, the tokenized and filtered background training data 602 and client training data 604 in the target language is also provided to the clustering process 714. The clustering process 714 first creates a cluster map 716 by assigning each word in the target language to a cluster, a group of words that occur in similar contexts. In one particular implementation, for example, the Brown clustering algorithm is utilized to cluster the words in the tokenized and filtered background training data 602 and client training data 604 in the target language. As known to those skilled in the art, Brown clustering is an agglomerative, bottom-up form of clustering that groups words (i.e., types) into a binary tree of classes using a merging criterion based on the log-probability of a text under a class-based language model (i.e. a probability model that takes the clustering into account). Details regarding one particular implementation of the Brown hierarchical word clustering algorithm in the C++ programming language can be found at cs.stanford.edu/~pliang/and github.com/percyliang/brown-cluster, both of which are incorporated herein by reference in their entirety.

Using the Brown clustering algorithm, monolingual text can be examined to identify words that tend to be used in the same way and appear in the same context. These words can then be mapped to the same cluster. The words in the background training data 602 and client training data 604 in the target language can then be replaced by unique cluster identifiers ("IDs") for the clusters they have been mapped to. A language model can then be built over the sequences of cluster IDs, as described in greater detail below.

Once the cluster map 716 has been established, a statistical cluster-based language model 510C is trained by mapping the target-language words in the language model training data to a cluster. As discussed above, the cluster-based language model 510C is then trained on the resulting cluster sequences. In one particular implementation, the cluster-based language model 510C is generated using the open-source KENLM language model generating tool. Additional details regarding the KENLM language model generating tool can be found at kheafield.com/code/kenlm/.

It should be appreciated that other language model generation tools or toolkits can be utilized in other configurations. In this regard, it should also be appreciated that while a single cluster-based language model 510C is shown in FIG. 7, multiple cluster-based language models can be utilized in other configurations. For example, separate cluster-based language models can be generated utilizing the background training data in the target language and the client training data in the target language. Other configurations can also be utilized. In this regard, it should also be appreciated that the open-source KENLM language model generating tool can also be utilized to generate the other language models described herein. Other language model generating tools and toolkits can also be utilized in other configurations.

As will be described in greater detail below, a run time capability for mapping lexical tokens to their appropriate word clusters in real time during decoding is also provided. This abstraction permits language models to recognize and statistically model much longer spans of text than previously possible, effectively modeling natural language patterns rather than just "raw" sentences in the language. In practice, this capability nearly doubles the context length that the disclosed statistical machine translation system can reliably use as a source of language model information. In this regard, it should be appreciated that the cluster-based language model 510C can be utilized in addition to the standard lexical-level language models 510A and 510B. Other configurations can also be utilized.

Figure 8:
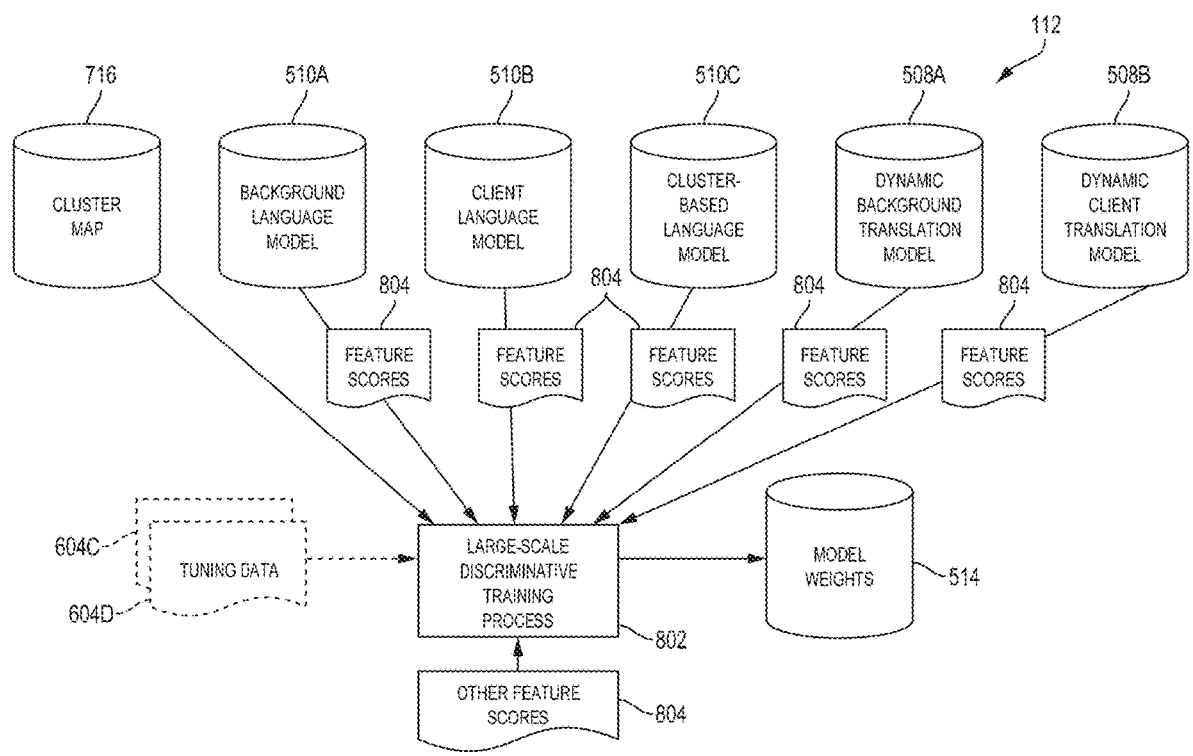
FIG. 8 is a block diagram showing aspects of the operation of the workflow shown in FIG. 6 for using large-scale discriminative training to generate model weights.

FIG. 8 is a system architecture diagram showing aspects of the operation of the workflow 612 shown in FIG. 6 for using large-scale discriminative training to generate model weights 514, according to one configuration disclosed herein. As discussed briefly above, the background language model 510A, the client language model 510B, the cluster-based language model 510C, the dynamic background translation model 508A, and the dynamic client translation model 508B can generate feature scores 804 for candidate translations of phrases in the input segments 524 at translation time. As discussed above, the feature scores 804 indicate how likely a translation is based upon the data that the model utilized to perform the translation was trained upon. Each of the various language and translation models can generate multiple feature scores. Additionally, the feature scores 804 can also include other statistical measures generated by the statistical machine translation system disclosed herein.

Due to the large number of feature scores 804 that are generated by the multiple translation and language models, the traditional line search approach to machine translation system optimization is insufficient. In order to address this consideration, and potentially others, the statistical machine translation system disclosed herein utilizes a large-scale discriminative training process 802 to generate optimized model weights 514 for the various feature scores 804. As mentioned above, in one configuration the MIRA algorithm is utilized to implement the large-scale discriminative training process 802. Other algorithms can also be utilized in other configurations.

As illustrated in FIG. 8, the large-scale discriminative training process 802 takes additional in-domain client tuning data 604C and 604D as input. As mentioned above, the additional in-domain client tuning data 604C and 604D can include sentences, paragraphs, or other phrases in the source and target languages that were not included in the client training data 604A and 604B. Additionally, the additional in-domain client tuning data 604C and 604D may include text of a type that is similar to the input segments 524 that will be encountered during production use of the machine translation system 600.

The large-scale discriminative training process 802 utilizes the additional client tuning data 604C and 604D and the feature scores 804 generated by the various translation and language models to optimize the model weights 514. The large-scale discriminative training process 802 also utilizes the cluster map 716 to map the additional client data 604 in the target language into clusters. Once the model weights 514 have been generated, they can then be applied to feature scores 804 for phrases in the candidate translations at run time. Additional details regarding this process are provided below.

It should be appreciated that, in one configuration, the statistical machine translation system described above does not have any in-domain client training data 604 available at the time of initial training. In this scenario, the translation package 516 can be generated utilizing only the out-of-domain training data 602. Subsequently, as in-domain client data is received, such as post-edited translations generated by the machine translation system, the system can be rapidly adapted in the manner described below with regard to FIGS. 9A-9B. In this manner, the statistical machine translation system can be implemented without the requirement of any in-domain client training data 604 initially. This can also reduce the time required to initially build the translation package 516.

In another scenario, the in-domain client training data 604 is extracted from the out-of-domain background training data 602. For example, and without limitation, a portion of the non-domain-specific background training data 602 that is relevant to the text to be translated at run time can be extracted from the non-domain-specific background training data 602. The relevant portion of the non-domain-specific background training data 602 can be selected utilizing various statistical methods. For example, and without limitation, various mechanisms can be utilized to select a portion of the out-of-domain data that is most similar to the data to be translated. This can be done in several ways. In particular, out-of-domain sentences that have high n-gram overlap (for example, phrases of two consecutive words) with the monolingual or in-domain data can be utilized as in-domain data. As another example, sentences that have a high likelihood according to a statistical language model trained on the monolingual in-domain data can also be utilized as in-domain data. Other mechanisms may be utilized in other configurations. The selected subset of the non-domain-specific background training data 602 can then be utilized as the initial set of in-domain client training data 604.

Figure 9A:
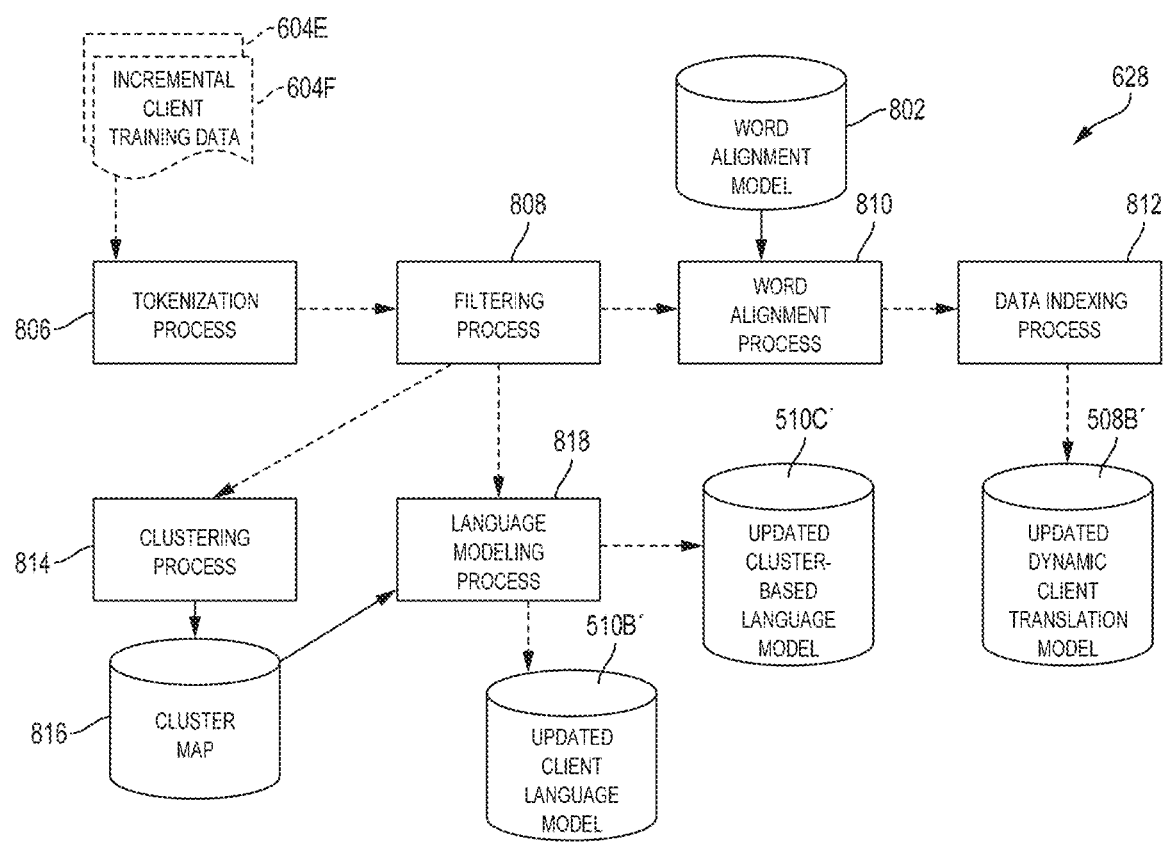
FIG. 9A is a block diagram showing aspects of the operation of the workflow shown in FIG. 6 for rapid adaptation of the dynamic translation models and the language models.

FIG. 9A is a system architecture diagram showing aspects of the operation of the workflow 628 shown in FIG. 6 for rapid adaptation of the dynamic translation models 508 and the language models 510, according to one configuration disclosed herein. As discussed briefly above, the workflow 628 provides functionality for rapid adaptation of the dynamic translation models 508, the language models 510, and the model weights 514. In order to perform rapid adaption of these components, the workflow 628 takes as input incremental in-domain client training data 604E-604F. For example, translations generated by translation service 312 might be post-edited by human translators to ensure that they are accurate translations of the associated input segment. As discussed above, an appropriate computer-generated user interface can be provided through which human post-editors can supply post-edited translations. A user's selection of an alternate N-best translation result on screen 206 in FIG. 2A or screen 254 in FIG. 2B are examples of such a post-edited translation. The input segments and their corresponding post-edited translations can then be utilized as the incremental client training data 604E-604F for use in rapidly adapting the dynamic translation models 508, the language models 510, and the model weights 514.

The in-domain incremental client training data 604E-604F is first tokenized by the tokenization process 806 described above. The filtering process 808, which was also described above, can then be applied to the incremental client training data 604E-604F. The word alignment process 810 can then utilize the previously learned word alignment model 802 to word align text in the incremental client training data 604E-604F. By using the previously generated word alignment model 802, word alignment of the incremental client training data 604E-604F can be performed more quickly than if word alignment were performed from scratch.

Once the incremental client training data 604E-604F has been tokenized, filtered, and word-aligned, the data indexing process 812 creates an updated dynamic client translation model 508B' by indexing the incremental client training data 604E-604F. For example, and without limitation, in configurations where the dynamic client translation model 508B is implemented using a suffix array data structure, the incremental client training data 604E-604F can be added to the suffix array data structure in order to create the updated dynamic client translation model 508B'.

As shown in FIG. 9A, the tokenized and filtered incremental client training data 604F in the target language can also be provided to the clustering process 814 and the language modeling process 818. The clustering process 814 can utilize the incremental client training data 604F in the target language to update the cluster map 816. Once the cluster map 816 has been updated, the language modeling process 818 can utilize the updated cluster map 816 to update the cluster-based language model 510C and create an updated cluster-based language model 510C'. Similarly, the language modeling process 818 can utilize the incremental client training data 604F in the target language to create an updated client language model 510B'.

In one particular configuration, an out-of-band process can be performed for identifying newly formed Brown clusters that are not well defined. This process can also work proactively to obtain data to build out the newly formed Brown clusters. For example, and without limitation, sentence variants can be recommended based on existing training data, or a search may be made for variants across a cross-domain training repository. In this manner, the cluster map 816 can be independently improved out-of-band without relying on the availability of new training data (i.e. the incremental client training data 604E-604F).

As will be described in greater detail below, the workflow 628 illustrated in FIGS. 9A and 9B can also generate an updated translation package containing the updated client language model 510B', the updated cluster-based language model 510C', the updated dynamic client translation model 508B', and updated model weights. The updated translation package can then be deployed to the service provider network 620 in place of the previous version of the translation package 516.

Figure 9B:
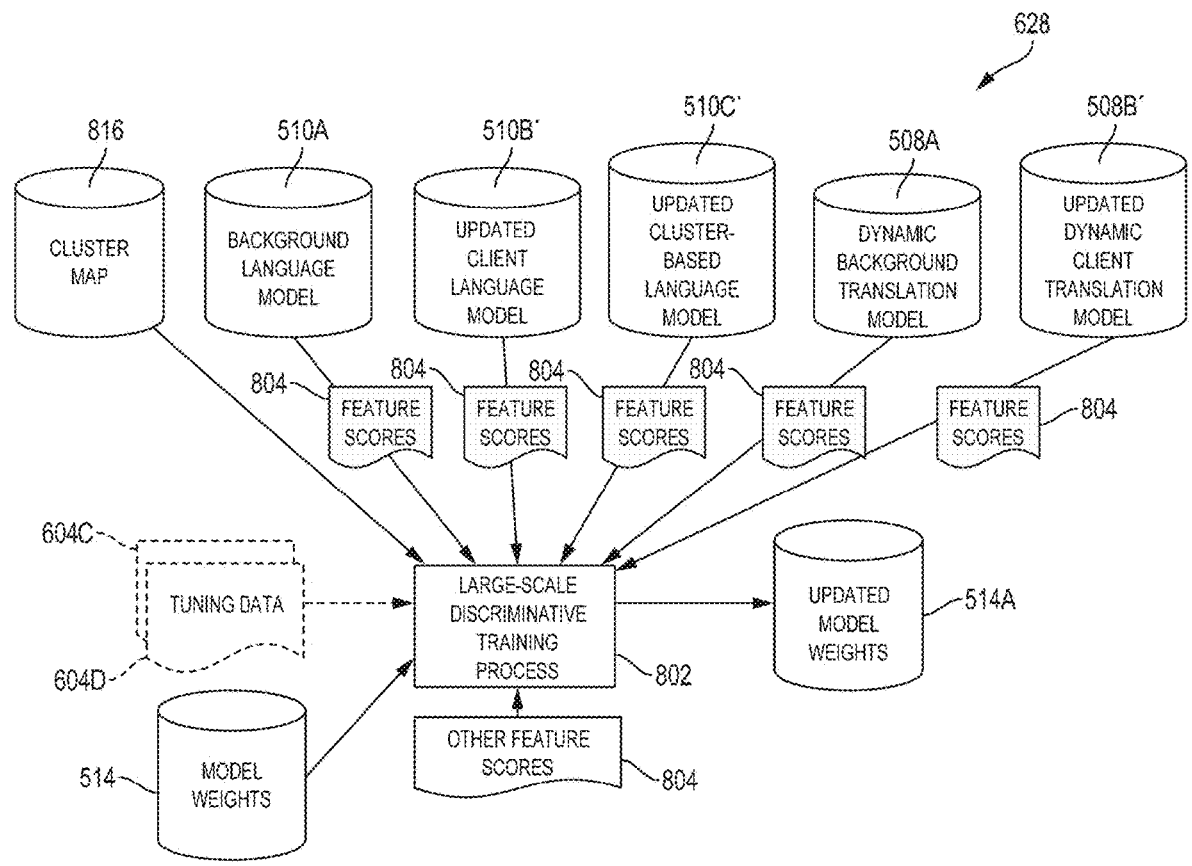
FIG. 9B is a block diagram showing additional aspects of the operation of the workflow shown in FIG. 6 for rapid adaptation of the model weights.

FIG. 9B is a system architecture diagram showing additional aspects of the operation of the workflow 628 shown in FIG. 6 for rapid adaptation of the model weights 514, according to one configuration disclosed herein. As discussed above, the large-scale discriminative training process 802 can also be utilized to generate updated model weights 514A for the updated dynamic client data translation model 508B', the updated cluster-based language model 510C', and the updated client language model 510B'. For example, and without limitation, the MIRA algorithm discussed above can utilize the additional client tuning data 604C-604D (which may or may not be the same tuning data used to generate the initial model weights 514) and the previously generated model weights 514 to generate updated model weights 514A utilizing fewer iterations than required to generate the initial model weights 514.

As mentioned above, an updated translation package (not shown in FIG. 9B) can then be created that includes the updated dynamic client data translation model 508B', the updated cluster-based language model 510C', the updated client language model 510B', and the updated model weights 514A. The updated translation package can then be deployed to the service provider network 620 in place of the previous version of the translation package 516.

As also mentioned briefly above, comparative testing is performed in some configurations between the earlier version of the translation package 516 and the updated translation package. The updated translation package can then be deployed, such as within the service provider network 620, in place of the previously deployed translation package 516 based upon the results of the testing. For example, and without limitation, the updated translation package is deployed in one configuration if the quality of the translations it generates are as good as or better than translations generated by the previously deployed translation package 516.

Figure 10:
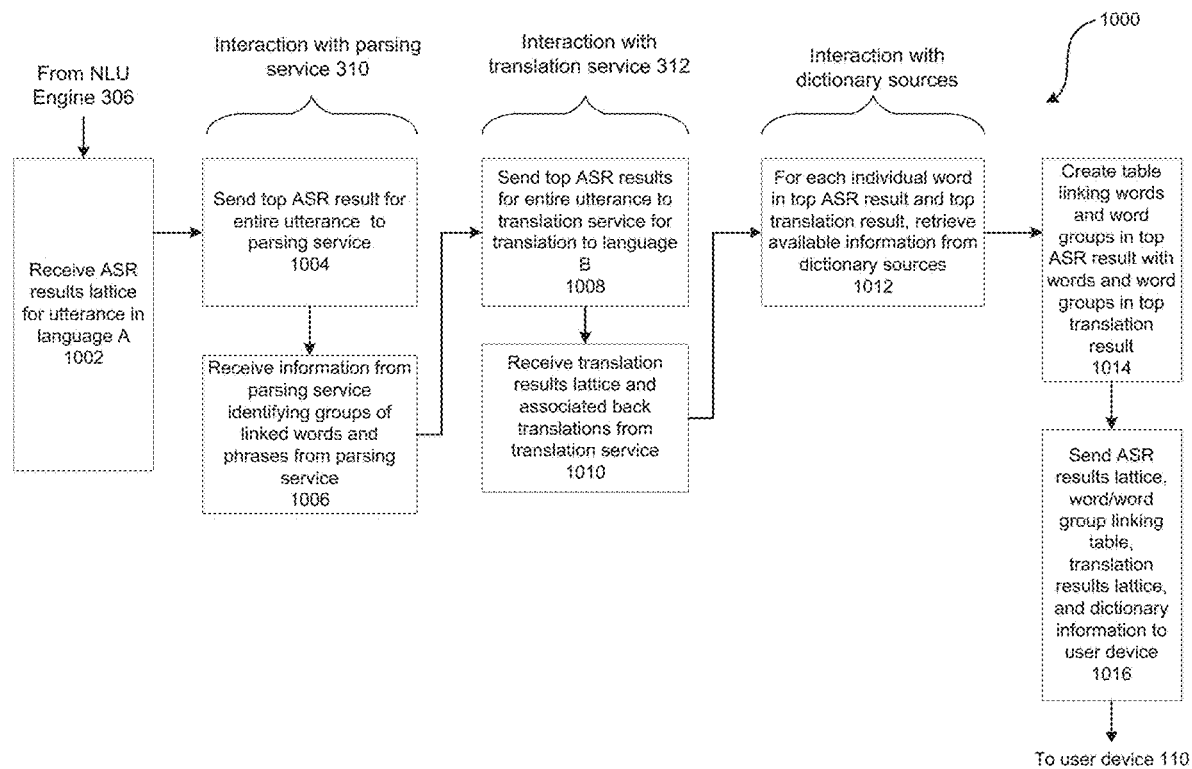
FIG. 10 is a flow chart illustrating an example of a routine that may be executed by the MT engine shown in FIGS. 3 and 4.

FIG. 10 illustrates an example routine 1000 that may be employed by the MT engine 308 shown in FIGS. 3 and 4. As noted above, the routine 1000 may be called, for example, when the NLU engine 306 identifies a user's command to translate a particular segment of text, e.g., a sentence, into another language. As shown, the routine 1000 begins at a step 1002, where the MT engine 308 receives an ASR result lattice for an utterance. Such an ASR result lattice may include not only an N-best ASR result list for the entire utterance, but also a data structure from which N-best ASR results for various segments of the entire utterance can be ascertained. The ASR results lattice may be generated by the ASR engine 304 and transferred directly to the MT engine 308 (either upon generation or in response to a request by the MT engine 308), or the NLU engine 306 may receive the ASR results lattice from the ASR engine 304 and then pass it to the MT engine 308 (as shown in FIG. 10).

At step 1004, the top result of the N-best ASR result list for the entire utterance, e.g. a sentence, is sent to a parsing service 310, which may be located on the same or a different server than the MT engine 308. At step 1006, the MT engine 308 receives information from the parsing service 310 that identifies groups of linked words and phrases within the text of the transmitted top ASR result. The parsing service 310 may, for example, break down the received text into respective phrases (e.g., noun phrases, verb phrases, gerund phrases, infinitive phrases, appositive phrases, adverbial phrases, adjectival phrases, participial phrases, prepositional phrases, absolute phrases, etc.) and possibly sub-phrases, i.e., phrases contained within other phrases, and use metadata or some other technique to link together the individual sub-phrases contained within each phrase and/or the individual words contained within each identified phrase or sub-phrase. In some embodiments, the parsing service 310 can evaluate the text using grammar rules and/or dictionaries for the language in which the sentence is written to identify the respective phrases and sub-phrases it contains.

At step 1008, the text of the top result of the N-best ASR result list for the entire utterance is sent to the translation service 312 for translation into another language (e.g., Spanish). The translation service 312 may also be on the same or a different server than the MT engine 308. The translation service 312 may then process the received text as an input segment 524 (shown in FIG. 5) and output an N-best results lattice identifying multiple hypotheses and corresponding confidence scores for the entirety of the input segment 524 as well as for the various sub-segments of the input segment 524.

At step 1010, the MT engine 308 receives the N-best translation results lattice from the translation service 312. As explained in more detail below in connection with steps 1118 and 1120 of routine 1100 shown in FIG. 11, the N-best translation results lattice can be used by a user device 110, for example, to present a list of options for correcting a translation of a multi-word sentence or segment, e.g., as shown on screen 206 in FIG. 2A or screen 254 in FIG. 2B.

At step 1012, the MT engine 308 retrieves information about individual words in the text of the top result of the N-best ASR result list as well as in the top result of the N-best translation result for that text. The MT engine 308 may, for example, access one or more dictionary sources on a local or remote database. In some implementations, dictionary definitions from publically accessible websites can be retrieved. In other implementations, proprietary dictionary information can be used. Where, for example, the translation service 312 translates text from English to Spanish, for individual words in the text of the top ASR result for the entire utterance, definitions from an English-to-Spanish translation dictionary can be retrieved, and, for individual results in the top translation result for the text, definitions from a Spanish-to-English translation dictionary can be retrieved. As explained in more detail below in connection with step 1104 of FIG. 11, the retrieved information may, for example, subsequently be displayed by a user device 110 in response to a user single-tapping on a single word segment on a display 104, e.g., as shown on screens 248 and 252 in FIG. 2C and screen 258 in FIG. 2D. Additional examples of information that may be retrieved and/or selectively displayed with respect to a word include: one or more synonyms of the word, one or more back translations of a translation of the word, one or more example sentences including the word, the word's part of speech, the verb conjugation of the word, the word's gender (for romance languages or other languages that support genders), an indication of whether the word is formal or informal, and one or more related words that might not be included in the N-best ASR results and/or N-best translations results.

At step 1014, the MT engine 308 creates a table or similar data structure linking words and word groups (i.e., phrases and sub-phrases) in the text of the top ASR result for the entire sentence with corresponding words and word groups for the top translation result for that text. This table can be created, for example, by stepping through each word and word group identified in the information received by the parsing service 310 at step 1006 and identifying one or more words in the top translation result that correspond to that word or word group. In some implementations, the information retrieved from dictionary sources and/or information in the N-best translation results lattice can be used to facilitate this task. As discussed above in connection with step 130 of routine 100 shown in FIG. 1, information in the table or data structure so generated may be used by a user device 110 to identify one or more corresponding items in one language when a displayed item in the other language is selected, e.g., single tapped, as illustrated, for example, on screens 204, 206, 248, 250, 252, 256, and 258 of FIGS. 2A-D.

Figure 11:
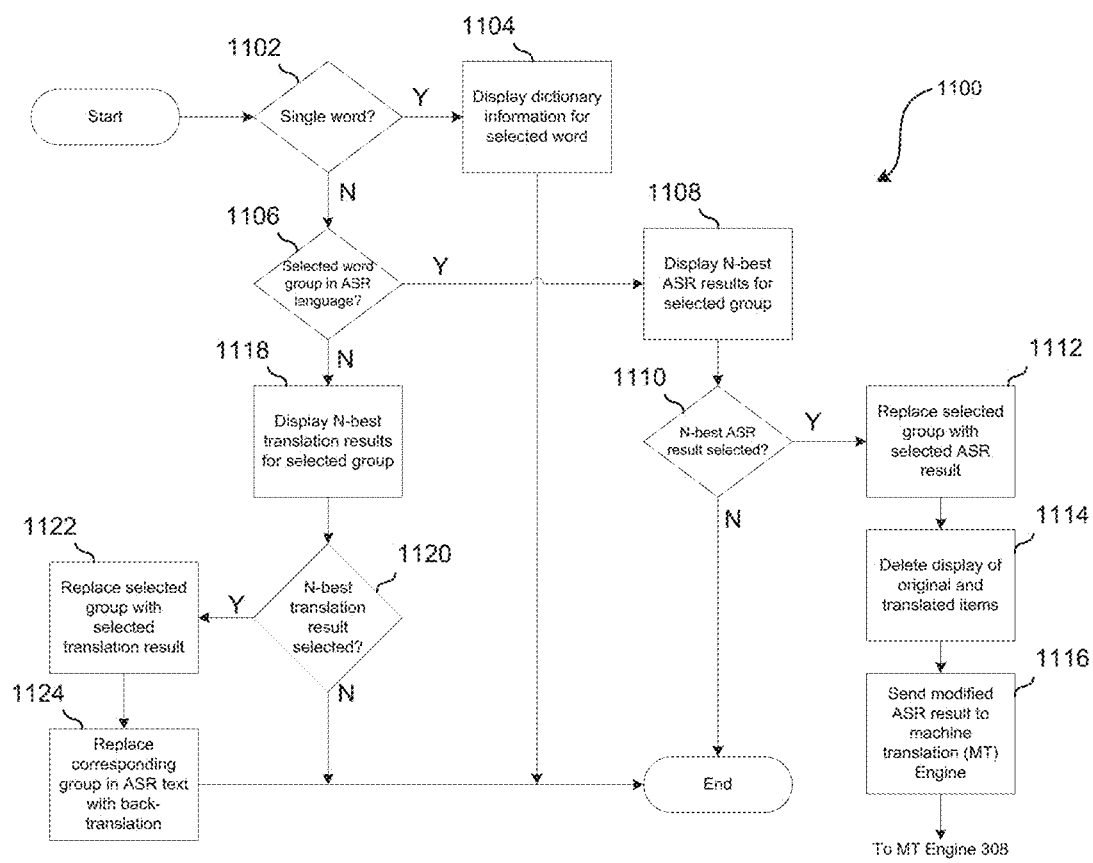
FIG. 11 is a flow chart illustrating a routine that may be executed to display dictionary information and/or enable modification of a selected item, as called for one of the steps in the routine shown in FIG. 1.

Finally, at step 1016, the ASR results lattice received from the NLU engine 308 at step 1002, the translation results lattice received from the translation service 312 at step 1010, the dictionary information retrieved at step 1012, and the table created at step 1014 may be sent to the user device 110 to implement the user-interface and functionality described above in connection with FIGS. 1 and 2A-2D and below in connection with FIG. 11.

As noted previously, FIG. 11 shows a routine that can be executed, e.g., by a device 110, at the step 132 of the routine 100 shown in FIG. 1. Step 132 may be invoked, for example, when a user single taps on an item displayed on a display 104. In the example implementation shown in FIGS. 2A-2D, for example, the step 132 determines the information that is to appear in boxes 236*a*-236*g*. As shown in FIG. 11, in some implementations, the type of information displayed in the box 236 may depend on whether the selected item is a single word or contains multiple words (step 1102). As seen, when the selected item is a single word, dictionary information corresponding to the word may be displayed in the box 236. The displayed dictionary information may, for example, correspond to the dictionary information retrieved at step 1010 of routine 1000 shown in FIG. 10. Examples of how the screen of display 104 may appear when an item containing a single word is selected are shown as screens 248 and 252 in FIG. 2C and screen 258 in FIG. 2D.

When the selected item is not a single word, on the other hand, a determination is made (step 1106) as to whether the selected multi-word item is in the original language (i.e., the language in which the ASR results are processed) or in the translated language (e.g., Spanish). When it is determined at step 1106 that the selected item is in the original language, the N-best ASR results corresponding to the selected item can be displayed in a box 236 (step 1108). The corresponding N-best ASR results can be identified, for example, by evaluating the N-best ASR results lattice received from the MT engine 308 (see step 1016 in FIG. 10). The display of N-best ASR results for selected items in a box 236 is illustrated, for example, on screen 204 in FIG. 2A and screen 242 in FIG. 2D.

When one of the displayed ASR results is selected (see step 1110), the highlighted item can be replaced with the selected alternative ASR result (step 1112), the displayed sentences in both languages can be deleted from the display 104 (step 1114), and the sentence containing the selected alternate ASR result can be sent to the ASR engine 308 for processing (step 1116), e.g., in the same way a new sentence received from the NLU engine 306 is processed, as described above. In some implementations, such user selections of alternative ones of the N-best ASR results (or other corrective actions taken by users 102) may be used to train the ASR engine 304 by appropriately adjusting one or more acoustic models and/or language models the ASR engine 304 employs, which models are discussed in more detail above in connection with FIG. 4.

When it is determined at step 1106 that the selected item is in the translated language, the N-best translation results corresponding to the selected item can be displayed in a box 236 (step 1118). The corresponding N-best translation results can be identified, for example, by evaluating the N-best translation results lattice received from the MT engine 308 (see step 1016 in FIG. 10).

When one of the displayed N-best translation results is selected (see step 1120), the highlighted item can be replaced with the selected alternative translation result (step 1122), and the corresponding segment(s) in the original language can be replaced with the back translation associated with the selected alternative translation result (step 1124). In some implementations, such user selections of alternative ones of the N-best translation results (or other corrective actions taken by users) may be used to train the MT engine 308 by appropriately adjusting one or more translation models, language models, and/or model weights the MT engine 308 employs, which items are discussed in more detail above in connection with FIGS. 5-9.

Various machine learning techniques may be used to perform the training of various models used by the above components. For example, components of ASR engine 304, NLU engine 306, MT engine 308, parsing service 310, translation service 312, or others may use various trained models. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 12:
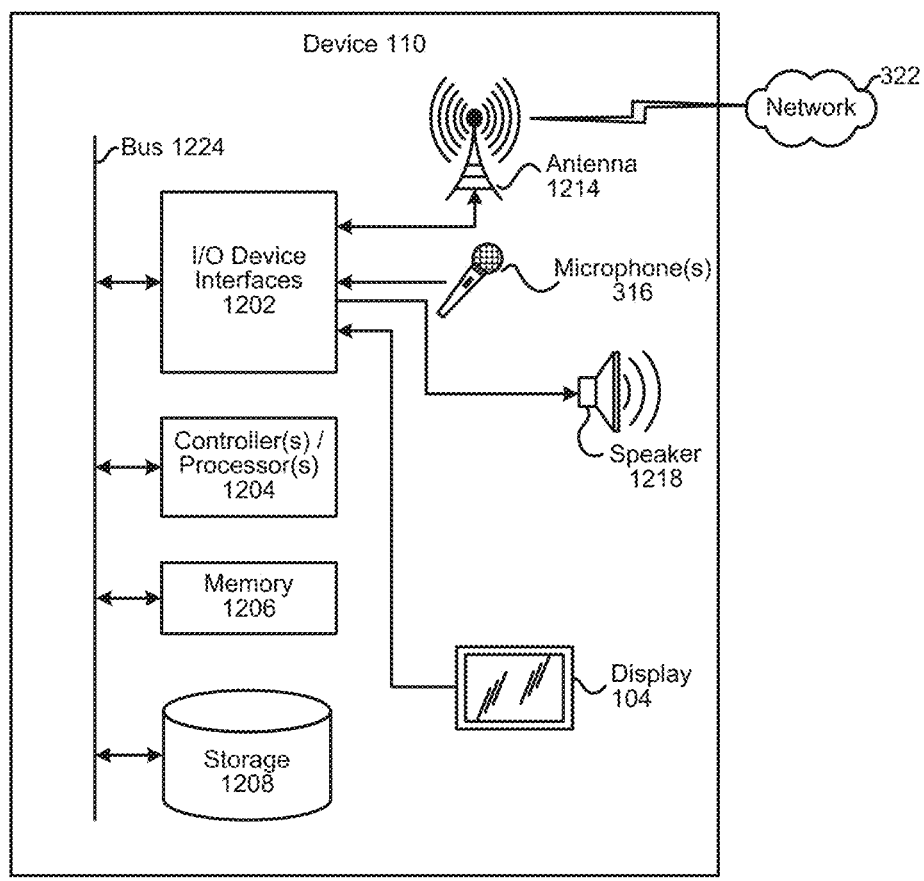
FIG. 12 is a block diagram conceptually illustrating example components of a device according to embodiments of the present disclosure.
Figure 13:
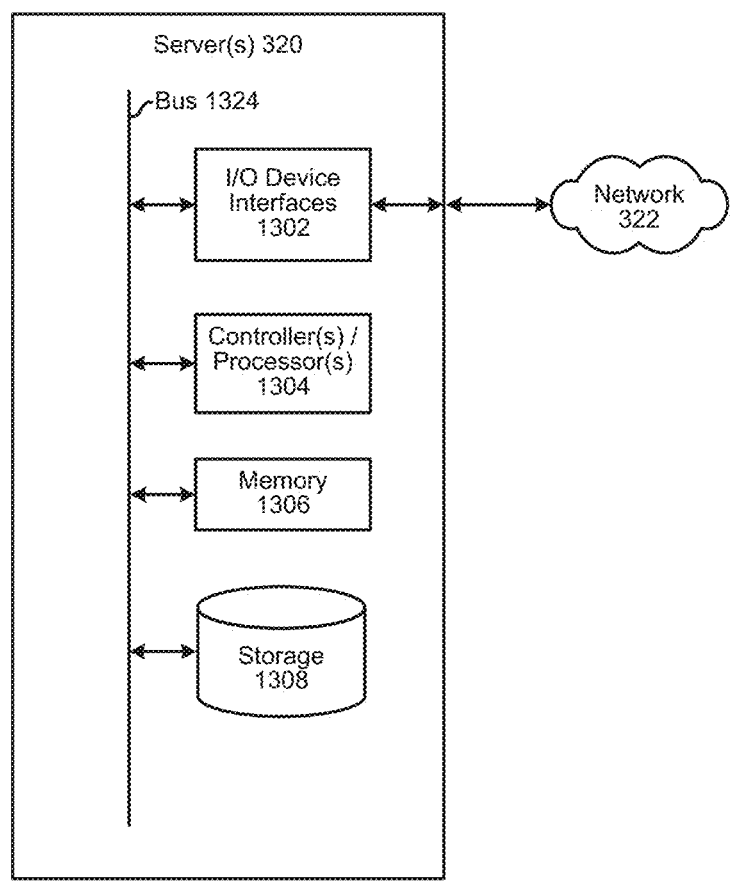
FIG. 13 is a block diagram conceptually illustrating example components of a server according to embodiments of the present disclosure.

FIG. 12 is a block diagram conceptually illustrating a computing device 110 that may be used with the described system. FIG. 13 is a block diagram conceptually illustrating example components of a remote device, such as the server 320, that may incorporate the ASR engine 304, the NLU engine 306, the MT engine 308, the parsing service 310, and/or the translation service 312 described herein. Multiple servers 320 may be included in the system, such as one server 320 for running the ASR engine 304, one server 320 for running the NLU engine 306, one server 320 for running the MT engine 308, one server 320 for running the parsing service 310, and one server 320 for running the translation service 312. In operation, each of these devices (or groups of devices) may include computer-readable and computer-executable instructions that reside on the respective device (110/320), as will be discussed further below.

Each of these devices (110/320) may include one or more controllers/processors (1204/1304) that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device (110/320) may also include a data storage component (1208/1308), for storing data and controller/processor-executable instructions. Each data storage component may individually include one or more non-volatile storage types such as magnetic storage, optical storage, solid-state storage, etc. Each device (110/320) may also be connected to removable or external non-volatile memory and/or storage (such as a removable memory card, memory key drive, networked storage, etc.) through respective input/output device interfaces (1202/1302).

Computer instructions for operating each device (110/320) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/320) includes input/output device interfaces (1202/1302). A variety of components may be connected through the input/output device interfaces (1202/1302), as will be discussed further below. Additionally, each device (110/320) may include an address/data bus (1224/1324) for conveying data among components of the respective device. Each component within a device (110/320) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1218, a visual output component such as a display 104, a wired headset or a wireless headset (not illustrated), or other component capable of outputting audio. The display 104 may output image and/or video data as described herein. The device 110 may also include an audio capture component. The audio capture component may be, for example, a microphone 316 or array of microphones, a wired headset or a wireless headset (not illustrated), etc. The microphone 316 may be configured to capture audio. If an array of microphones is included, approximate distance to a sound's point of origin may be determined by acoustic localization based on time and amplitude differences between sounds captured by different microphones of the array.

For example, via antenna(s) 1214, the input/output device interfaces 1202 may connect to one or more networks 322 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, etc. A wired connection such as Ethernet may also be supported. Through the network(s) 322, the speech processing system may be distributed across a networked environment.

The device 110 and/or the server 320 may include components of an ASR engine 304, an NLU engine 306, an MT engine 308, a parsing service 310, and/or a translation service 312, such as those described above. In some implementations, the ASR engine 304 in the device 110 may be of limited or extended capabilities. The ASR engine 304 may include the language models 454 stored in ASR model storage component 452. If limited speech recognition is included, the ASR engine 304 may be configured to identify a limited number of words, whereas extended speech recognition may be configured to recognize a much larger range of words. As noted above, multiple devices may be employed in a single speech processing system. In such a multi-device system, each of the devices may include different components for performing different aspects of the ASR, NLU, parsing, and translation functionality described herein. The multiple devices may include overlapping components. The components of the device 110 and the server(s) 320, as illustrated in FIGS. 12 and 13, are exemplary, and may be located as a stand-alone device or may be included, in whole or in part, as a component of a larger device or system.

Figure 14:
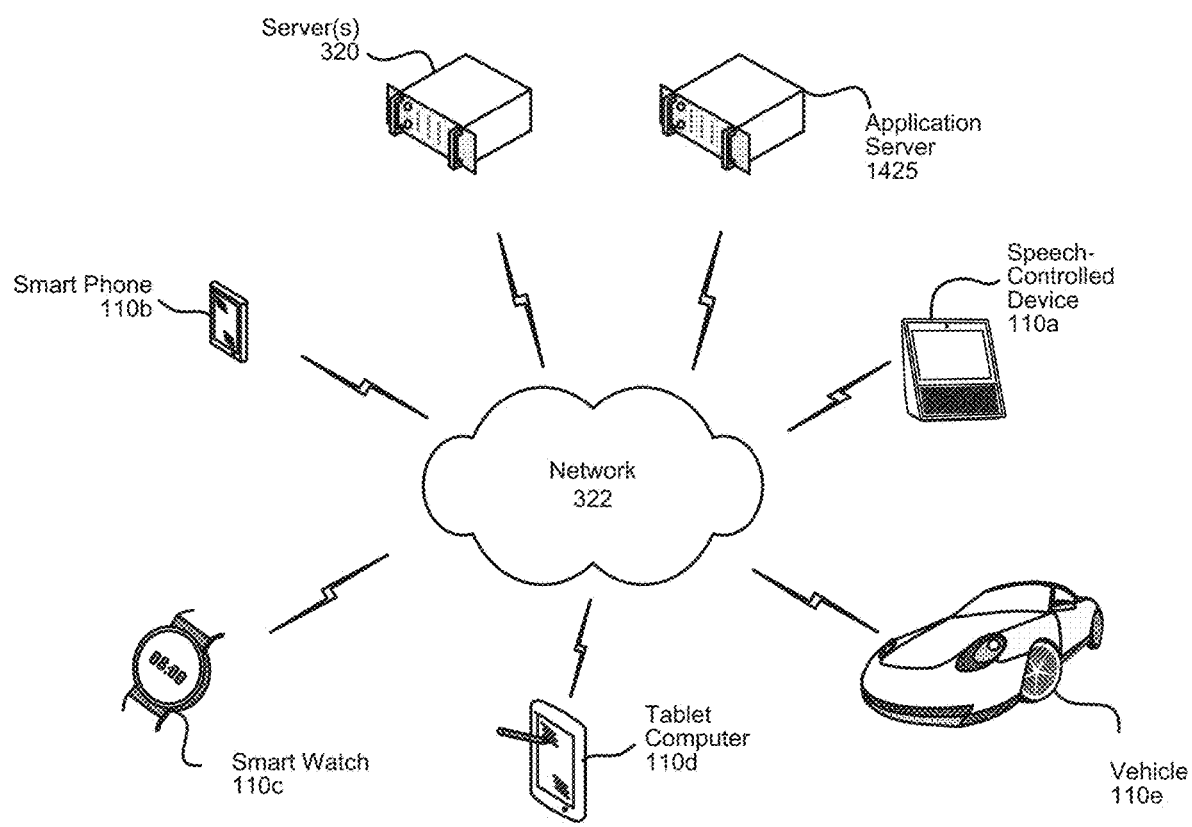
FIG. 14 illustrates an example of a computer network for use with the system.

As illustrated in FIG. 14, multiple devices (320, 110a-110e) may contain components of the system and the devices may be connected over a network 322. The network 322 may include a local or private network or may include a wide network such as the Internet. Devices may be connected to the network 322 through either wired or wireless connections. For example, the user device 110a, a tablet computer 110d, a smart phone 110b, a smart watch 110c, and/or a vehicle 110e may be connected to the network 322 through a wireless service provider, over a WiFi or cellular network connection, or the like. Other devices are included as network-connected support devices, such as the server(s) 320, application developer devices (e.g., the application server 1425), or others. The support devices may connect to the network 322 through a wired connection or wireless connection. Networked devices may capture audio using one-or-more built-in or connected microphones 316 or audio capture devices, with processing performed by ASR, NLU, parsing, translation, or other components of the same device or another device connected via the network 322, such as the ASR engine 304, the NLU engine 306, the MT engine 308, the parsing service 310, the translation service 312, etc., of one or more servers 320.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 456, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. An apparatus, comprising:
a screen;
at least one processor; and
at least one computer-readable medium encoded with instructions that, when executed by the at least one processor, cause the apparatus to:
display, on the screen, first text corresponding to a first version of a sentence in a first language;
display, on the screen, second text corresponding to a second version of the sentence in a second language;
indicate, on the screen, that two or more first segments of the first text and two or more second segments of the second text are individually selectable;
detect, while the two or more first segments and the two or more second segments are simultaneously indicated as being individually selectable, user selection of one of the first segments;
indicate, on the screen, the selected one of the first segments;
indicate, on the screen, one or more of the second segments that correspond to a translation of the selected one of the first segments;
detect, while the two or more first segments and the two or more second segments are indicated as being individually selectable, user selection of one of the second segments;
indicate, on the screen, the selected one of the second segments; and
indicate, on the screen, one or more of the first segments that correspond to a translation of the selected one of the second segments.

2. The apparatus of claim 1, wherein the at least one computer-readable medium is encoded with additional instructions that, when executed by the at least one processor, further cause the apparatus to:
receive audio corresponding to an utterance;
send, to a remote computing system, audio data corresponding to the utterance;
receive, from the remote computing system, the first text corresponding to a highest ranked automatic speech recognition (ASR) result generated by an ASR engine based on the audio data; and
receive, from the remote computing system, the second text corresponding to a machine translation result based on the ASR result.

3. The apparatus of claim 2, wherein the at least one computer-readable medium is encoded with additional instructions that, when executed by the at least one processor, further cause the apparatus to:
receive, from the remote computing system, at least one lower ranked ASR result generated by an ASR engine based on at least a portion of the audio data;
display, on the screen, the at least one lower ranked ASR result as at least one option for correcting the selected one of the first segments;
detecting user selection of the at least one option; and
display new text corresponding to a correction of the selected one of the first segments based on selection of the at least one option.

4. The apparatus of claim 1, wherein the at least one computer-readable medium is encoded with additional instructions that, when executed by the at least one processor, further cause the apparatus to:
send the first text to a remote computing system for translation into the second text; and
receive, from the remote computing system, the second text.

5. The apparatus of claim 1, wherein the at least one computer-readable medium is encoded with additional instructions that, when executed by the at least one processor, further cause the apparatus to:
determine that the selected one of the first segments consists of a single word; and
display, on the screen, dictionary information concerning the single word.

6. The apparatus of claim 1, wherein the at least one computer-readable medium is encoded with additional instructions that, when executed by the at least one processor, further cause the apparatus to:
display, on the screen, at least one option for correcting the selected one of the first segments;
detect user selection of the at least one option; and
display, on the screen, new text corresponding to a correction of the selected one of the first segments based on the user selection of the at least one option.

7. The apparatus of claim 6, wherein the at least one computer-readable medium is encoded with additional instructions that, when executed by the at least one processor, further cause the apparatus to:

receive, from a remote computing system, at least one alternate translation result for the selected one of the first segments; and display, on the screen, the at least one alternate translation result as the at least one option.

8. The apparatus of claim 1, wherein the at least one computer-readable medium is encoded with additional instructions that, when executed by the at least one processor, further cause the apparatus to:

determine that the selected one of the first segments consists of a first single word;

display, on the screen, first dictionary information concerning the first single word;

determine that the selected one of the second segments consists of a second single word; and display, on the screen, second dictionary information concerning the second single word.

9. An apparatus, comprising:

a screen;

at least one processor; and at least one computer-readable medium encoded with instructions that, when executed by the at least one processor, cause the apparatus to:

display, on the screen, at least a first text segment, the first text segment including first text, wherein the first text segment is included in a first version of a sentence in a first language;

send a representation of the first version of the sentence to a remote computing system for machine translation into a second version of the sentence in a second language;

display, on the screen, second text included in the second version of the sentence;

indicate, on the screen, that the first text segment is individually selectable;

detect, while the first text segment is indicated as being individually selectable, a first type of user action selecting the first text segment;

in response to detecting the first type of user action selecting the first text segment, display, on the screen, first information corresponding to the first text segment;

detect, while the first text segment is indicated as being individually selectable, a second type of user action selecting the first text segment, the second type of user action including a double tap, a long tap, a double click, or a long click; and in response to detecting the second type of user action selecting the first text segment, indicate, on the screen, that two or more segments of the first text are individually selectable, wherein the second type of user action is different than the first type of user action, and each of the two or more segments of the first text is shorter than the first text segment.

10. The apparatus of claim 9, wherein the at least one computer-readable medium is encoded with additional instructions that, when executed by the at least one processor, further cause the apparatus to:

receive audio corresponding to an utterance;

send, to a remote computing system, audio data corresponding to the utterance; and receive, from the remote computing system, the first text corresponding to an automatic speech recognition (ASR) result based on the audio data.

11. The apparatus of claim 9, wherein the at least one computer-readable medium is encoded with additional instructions that, when executed by the at least one processor, further cause the apparatus to:

in response to detecting the first type of user action selecting the first text segment, display the first information at least in part by displaying, on the screen, at least one option for correcting the first text segment;

detect user selection of the at least one option; and display new text corresponding to a correction of the first text segment based on the user selection of the at least one option.

12. The apparatus of claim 11, wherein the at least one computer-readable medium is encoded with additional instructions that, when executed by the at least one processor, further cause the apparatus to:

receive audio corresponding to an utterance;

send, to a remote computing system, audio data corresponding to the utterance;

receive, from the remote computing system, the first text corresponding to a highest ranked automatic speech recognition (ASR) result generated by an ASR engine based on the audio data;

receive, from the remote computing system, at least one lower ranked ASR result generated by the ASR engine based on at least a portion of the audio data; and display, on the screen, the at least one lower ranked ASR result as the at least one option for correcting the first text segment.

13. The apparatus of claim 9, wherein the at least one computer-readable medium is encoded with additional instructions that, when executed by the at least one processor, further cause the apparatus to:

determine that the first text segment consists of a single word; and in response to detecting the first type of user action selecting the first text segment, display, on the screen, dictionary information concerning the single word.

14. The apparatus of claim 9, wherein the second text includes at least a second text segment, and the at least one computer-readable medium is encoded with additional instructions that, when executed by the at least one processor, further cause the apparatus to:

indicate, on the screen, that the second text segment is individually selectable;

detect, while the second text segment is indicated as being individually selectable, the second type of user action selecting the second text segment; and in response to detecting the second type of user action selecting the second text segment, indicate, on the screen, that two or more segments of the second text are individually selectable.

15. The apparatus of claim 9, wherein the at least one computer-readable medium is encoded with additional instructions that, when executed by the at least one processor, further cause the apparatus to:

display, on the screen together with the first text segment, a second text segment included in the first version of the sentence; and in response to detecting the first type of user action selecting the first text segment, display the first information at least in part by displaying a first indication that the first text segment has been selected and a second indication that a portion of the second text corresponds to a translation of the first text segment.

16. The apparatus of claim 9, wherein the at least one computer-readable medium is encoded with additional instructions that, when executed by the at least one processor, further cause the apparatus to:

receive audio corresponding to an utterance;

determine the first text segment based at least in part on a first automatic speech recognition (ASR) result corresponding to at least a portion of the utterance; and in response to detecting the first type of user action selecting the first text segment, display the first information at least in part by displaying at least one alternate ASR result corresponding to at least the portion of the utterance.

17. The apparatus of claim 9, wherein the at least one computer-readable medium is encoded with additional instructions that, when executed by the at least one processor, further cause the apparatus to:

receive audio corresponding to an utterance;

determine the first text segment based at least in part on a first automatic speech recognition (ASR) result corresponding to a first portion of the utterance and a second text segment based at least in part on a second automatic speech recognition (ASR) result corresponding to a second portion of the utterance;

display, on the screen together with the first text segment, the second text segment;

detect the first type of user action selecting the first text segment;

determine that the first text segment includes multiple words; and in response to detecting the first type of user action selecting the first text segment and based at least in part on the first text segment including multiple words, display the first information at least in part by displaying at least one alternate ASR result corresponding to the first portion of the utterance.

18. The apparatus of claim 17, wherein the at least one computer-readable medium is encoded with additional instructions that, when executed by the at least one processor, further cause the apparatus to:

detect the first type of user action selecting the second text segment;

determine that the second text segment consists of a single word; and based at least in part on the second text segment consisting of a single word, display, on the screen, dictionary information corresponding to the single word.

19. A computer-implemented method, comprising:

displaying, on a screen, at least a first text segment, the first text segment including first text, wherein the first text segment is included in a first version of a sentence in a first language;

sending a representation of the first version of the sentence to a remote computing system for machine translation into a second version of the sentence in a second language;

displaying, on the screen, second text included in the second version of the sentence;

indicating, on the screen, that the first text segment is individually selectable;

detecting, while the first text segment is indicated as being individually selectable, a first type of user action selecting the first text segment;

in response to detecting the first type of user action selecting the first text segment, displaying, on the screen, first information corresponding to the first text segment;

detecting, while the first text segment is indicated as being individually selectable, a second type of user action selecting the first text segment, the second type of user action including a double tap, a long tap, a double click, or a long click; and in response to detecting the second type of user action selecting the first text segment, indicating, on the screen, that two or more segments of the first text are individually selectable, wherein the second type of user action is different than the first type of user action, and each of the two or more segments of the first text is shorter than the first text segment.

20. The computer-implemented method of claim 19, further comprising:

in response to detecting the first type of user action selecting the first text segment, displaying the first information at least in part by displaying, on the screen, at least one option for correcting the first text segment;

detecting user selection of the at least one option; and displaying new text corresponding to a correction of the first text segment based on the user selection of the at least one option.

21. The computer-implemented method of claim 20, further comprising:

receiving audio corresponding to an utterance;

sending, to a remote computing system, audio data corresponding to the utterance;

receiving, from the remote computing system, the first text corresponding to a highest ranked automatic speech recognition (ASR) result generated by an ASR engine based on the audio data;

receiving, from the remote computing system, at least one lower ranked ASR result generated by the ASR engine based on at least a portion of the audio data; and displaying, on the screen, the at least one lower ranked ASR result as the at least one option for correcting the first text segment.

22. The computer-implemented method of claim 19, further comprising:

receiving audio corresponding to an utterance;

determining the first text segment based at least in part on a first automatic speech recognition (ASR) result corresponding to a first portion of the utterance and a second text segment based at least in part on a second automatic speech recognition (ASR) result corresponding to a second portion of the utterance;

displaying, on the screen together with the first text segment, the second text segment;

detecting the first type of user action selecting the first text segment;

determining that the first text segment includes multiple words; and in response to detecting the first type of user action selecting the first text segment and based at least in part on the first text segment including multiple words, displaying the first information at least in part by displaying at least one alternate ASR result corresponding to the first portion of the utterance.

23. The computer-implemented method of claim 22, further comprising:

detecting the first type of user action selecting the second text segment;

determining that the second text segment consists of a single word; and based at least in part on the second text segment consisting of a single word, displaying, on the screen, dictionary information corresponding to the single word.

24. The computer-implemented method of claim 19, wherein the second text includes at least a second text segment, and the method further comprises:

indicating, on the screen, that the second text segment is individually selectable;

detecting, while the second text segment is indicated as being individually selectable, the second type of user action selecting the second text segment; and in response to detecting the second type of user action selecting the second text segment, indicating, on the screen, that two of more segments of the second text are individually selectable.

\* \* \* \* \*